(12) United States Patent
Barker et al.

(10) Patent No.: US 10,978,708 B2
(45) Date of Patent: *Apr. 13, 2021

(54) DOPED NICKELATE COMPOUNDS

(71) Applicant: FARADION LIMITED, Sheffield (GB)

(72) Inventors: Jeremy Barker, Chipping Norton (GB); Richard Heap, Oxford (GB)

(73) Assignee: FARADION LIMITED, Sheffield (GB)

( * ) Notice: Subject to any disclaimer, the term of this patent is extended or adjusted under 35 U.S.C. 154(b) by 473 days.

This patent is subject to a terminal disclaimer.

(21) Appl. No.: 15/110,647

(22) PCT Filed: Jan. 8, 2015

(86) PCT No.: PCT/GB2015/050023
§ 371 (c)(1),
(2) Date: Jul. 8, 2016

(87) PCT Pub. No.: WO2015/104543
PCT Pub. Date: Jul. 16, 2015

(65) Prior Publication Data
US 2016/0329564 A1 Nov. 10, 2016

(30) Foreign Application Priority Data
Jan. 9, 2014 (GB) .................................. 1400347.9

(51) Int. Cl.
*H01M 4/525* (2010.01)
*H01M 4/505* (2010.01)
(Continued)

(52) U.S. Cl.
CPC ............ *H01M 4/525* (2013.01); *C01G 53/40* (2013.01); *C01G 53/42* (2013.01); *C01G 53/66* (2013.01);
(Continued)

(58) Field of Classification Search
CPC . H01M 4/13–131; H01M 4/139–1391; H01M 4/48; H01M 4/50–525; H01M 10/054
See application file for complete search history.

(56) References Cited

U.S. PATENT DOCUMENTS 9,917,307 B2 * 3/2018 Barker .................. C01G 53/40
2004/0110063 A1 * 6/2004 Uchitomi .............. H01M 4/505
429/223
(Continued)

FOREIGN PATENT DOCUMENTS

CN 1610152 A 4/2005
CN 101043093 A 9/2007
(Continued)

OTHER PUBLICATIONS

Kim, S., et al., Electrode materials for rechargeable sodium-ion batteries: potential alternatives to current lithium-ion batteries. Adv. Energy Mater., 2: 710-721. doi:10.1002/AENM.201200026. Published Jul. 15, 2012 (Year: 2012).*
(Continued)

*Primary Examiner* — Jonathan Crepeau
*Assistant Examiner* — Jacob Buchanan
(74) *Attorney, Agent, or Firm* — Meunier Carlin & Curfman LLC

(57) ABSTRACT

The invention relates to doped nickelate-containing compounds comprising $A_aM^1{}_vM^2{}_wM^3{}_xM^4{}_yM^5{}_zO_{2-c}$ wherein A comprises either sodium or a mixed alkali metal in which sodium is the major constituent; $M^1$ is nickel in oxidation state greater than 0 to less than or equal to 4+, $M^2$ comprises a metal in oxidation state greater than 0 to less than or equal to 4+, $M^3$ comprises a metal in oxidation state 2+, $M^4$ comprises a metal in oxidation state greater than 0 to less than or equal to 4+, and $M^5$ comprises a metal in oxidation state 3+ wherein $0 \leq a < 1$, $v > 0$, at least one of w and y is $> 0$ $x \geq 0$, $z \geq 0$ wherein c is determined by a range selected from
(Continued)

$0 < c \leq 0.1$ and wherein (a, v, w, x, y, z and c) are chosen to maintain electroneutrality.

8 Claims, 31 Drawing Sheets

(51) Int. Cl.

| | |
|---|---|
| H01M 10/054 | (2010.01) |
| H01M 4/131 | (2010.01) |
| H01M 4/485 | (2010.01) |
| H01M 4/04 | (2006.01) |
| H01M 10/44 | (2006.01) |
| H01M 4/1391 | (2010.01) |
| C01G 53/00 | (2006.01) |
| H01G 9/025 | (2006.01) |
| H01M 10/52 | (2006.01) |
| H01M 4/133 | (2010.01) |
| G02F 1/1524 | (2019.01) |
| H01M 4/02 | (2006.01) |

(52) U.S. Cl.
CPC .......... *H01G 9/025* (2013.01); *H01M 4/0447* (2013.01); *H01M 4/131* (2013.01); *H01M 4/1391* (2013.01); *H01M 4/505* (2013.01); *H01M 10/054* (2013.01); *H01M 10/446* (2013.01); *C01P 2002/72* (2013.01); *C01P 2006/40* (2013.01); *G02F 1/1524* (2019.01); *H01M 4/133* (2013.01); *H01M 4/485* (2013.01); *H01M 10/52* (2013.01); *H01M 2004/028* (2013.01); *H01M 2300/002* (2013.01); *H01M 2300/0028* (2013.01)

(56) References Cited

U.S. PATENT DOCUMENTS

| | | | |
|---|---|---|---|
| 2007/0218359 A1 | 9/2007 | Shimizu | |
| 2007/0218361 A1* | 9/2007 | Inoue | H01M 4/131 429/231.1 |
| 2007/0224506 A1 | 9/2007 | Ooyama et al. | |
| 2008/0187831 A1* | 8/2008 | Barker | H01M 4/485 429/188 |
| 2010/0129715 A1* | 5/2010 | Saito | H01M 4/505 429/224 |
| 2012/0015230 A1* | 1/2012 | Kuze | C01G 45/1228 429/144 |
| 2012/0183837 A1* | 7/2012 | Johnson | H01M 4/366 429/156 |
| 2013/0224588 A1* | 8/2013 | Kageura | H01M 4/131 429/211 |
| 2014/0131617 A1* | 5/2014 | Park | H01M 4/505 252/182.1 |
| 2017/0174527 A1* | 6/2017 | Barker | C01G 53/50 |

FOREIGN PATENT DOCUMENTS

| | | |
|---|---|---|
| CN | 102341941 A | 2/2012 |
| CN | 103579605 A | 2/2014 |
| GB | 2503896 A | 1/2014 |
| GB | 2506859 A | 4/2014 |
| JP | 2003242976 A | 8/2003 |
| JP | 2012206925 A | 10/2012 |
| JP | 2013175311 A | 9/2013 |
| WO | 2011129419 A1 | 10/2011 |
| WO | 2013073633 A1 | 5/2013 |
| WO | 2013118661 A1 | 8/2013 |
| WO | 2013140174 A2 | 9/2013 |
| WO | 2014009710 A1 | 1/2014 |
| WO | 2014009722 A1 | 1/2014 |
| WO | 2014009723 A1 | 1/2014 |
| WO | 2014009724 A1 | 1/2014 |
| WO | 2014057258 A1 | 4/2014 |
| WO | 2014077663 A1 | 5/2014 |

OTHER PUBLICATIONS

English Translation of JP Office Action issued in JP 2016-545866, dated Aug. 28, 2018.
First Office Action and Search Report issued in connection with Chinese Application No. 201580040798, dated Feb. 20, 2017.
Kim, D., et al., "Enabling Sodium Batteries Using Lithium-Substituted Sodium Layered Transition Metal Oxide Cathodes," Advanced Energy Materials, 2011, 1, pp. 333-336.
Search Report and Written Opinion of the GB Intellectual Property Office from Application No. GB1400347.9 dated Jul. 10, 2014, 4 pages.
Search Report and Written Opinion of the GB Intellectual Property Office from Application No. GB1400347.9 dated Feb. 9, 2015, 2 pages.
Buchholz, D., Chagas, L. G., Winter, M., & Passerini, S. (2013). P2-type layered $Na_{0.45}Ni_{0.22}Co_{0.11}Mn_{0.66}O_2$ as Intercalation host material for lithium and sodium batteries. Electrochimica Acta, 110, 208-213.
Chagas, L. G., Buchholz, D., Wu, L., Vortmann, B., & Passerini, S. (2014). Unexpected performance of layered sodium-ion cathode material in ionic liquid-based electrolyte. Journal of Power Sources, 247, 377-383.
Lei, Y. et al. (2014). Synthesis and Stoichiometry of Different Layered Sodium Cobalt Oxides. Chemistry of Materials, 26, 5288-5296.
International Preliminary Report on Patentability of the International Preliminary Examining Authority, Application No. PCT/GB2015/051495, dated May 2, 2016, 5 pages.
International Search Report and Written Opinion of the International Searching Authority, Application No. PCT/GB2015/051495, dated Jul. 17, 2015, 9 pages.
Kim et al. 2014. Approaching the Theoretical Capacities of $LiMnBO_3$. Abstract of presentation given at 17th International Meeting on Lithium Batteries, Jun. 10-14, 2014. Como, Italy.
Lee, D. H., Xu, J., & Meng, Y. S. (2013). An advanced cathode for Na-ion batteries with high rate and excellent structural stability. Physical Chemistry Chemical Physics, 15(9), 3304-3312.
Lu, Z. & Dahn, J. R. (2001). Can All the Lithium be Removed from $T2Li_{2/3}[Ni_{1/3}Mn_{2/3}]O_2$?. Journal of the Electrochemical Society, 148(7), A710-A715.
Pollet, M., Blangero, M., Doumerc, J. P., Decourt, R., Carlier, D., Denage, C., & Delmas, C. (2009). Structure and properties of alkali cobalt double oxides $A_{0.6}CoO_2$ (A= Li, Na, and K). Inorganic chemistry, 48(20), 9671-9683.
Search Report of the GB Intellectual Property Office, Application No. GB1409163.1, dated Nov. 25, 2014, 5 pages.
Search Report of the GB Intellectual Property Office—Amended, Application No. GB1409163.1, dated Dec. 2, 2014, 3 pages.
Search Report of the GB Intellectual Property Office, Application No. GB1421105.6, dated May 26, 2015, 4 pages.
Shin, Y. J., & Yi, M. Y. (2000). Preparation and structural properties of layer-type oxides $Na_xNi_{x/2}Ti_{1-x/2}O_2$ ($0.60 \leq x \leq 1.0$). Solid State Ionics, 132(1), 131-141.
Smirnova, O. A., Avdeev, M., Nalbandyan, V. B., Kharton, V. V., & Marques, F. M. B. (2006). First observation of the reversible O3↔P2 phase transition: Crystal structure of the quenched high-temperature phase $Na_{0.74}Ni_{0.58}Sb_{0.42}O_2$. Materials Research Bulletin, 41(6), 1056-1062.
Tournadre, F., Croguennec, L., Saadoune, I., Carlier, D., Shao-Horn, Y., Willmann, P., & Delmas, C. (2004). On the mechanism of the $P2-Na_{0.70}CoO_2 \rightarrow O2-LiCoO_2$ exchange reaction—Part I: proposition of a model to describe the P2-O2 transition. Journal of Solid State Chemistry, 177(8), 2790-2802.
Wang, H., Yang, B., Liao, X. Z., Xu, J., Yang, D., He, Y. S., & Ma, Z. F. (2013). Electrochemical properties of $P2-Na_{2/3}[Ni_{1/3}Mn_{2/3}]O_2$ cathode material for sodium ion batteries when cycled in different voltage ranges. Electrochimica Acta, 113, 200-204.

(56) References Cited

OTHER PUBLICATIONS

Yuan, D. et al. (2014). P2-type Na0.67Mn0.65Fe0.2Ni0.15O2 cathode material with high-capacity for sodium-ion battery. Electrochimica Acta, 116, 300-305.

International Preliminary Report on Patentability of the International Preliminary Examining Authority, Application No. PCT/GB2015/051482, dated Jul. 19, 2016, 6 pages.

International Search Report and Written Opinion of the International Searching Authority, Application No. PCT/GB2015/051482, dated Jul. 24, 2015, 11 pages.

Han, M.H. et al. (2015). A comprehensive review of sodium layered oxides: powerful cathodes for Na-ion batteries. Energy Environ. Sci., 8, 81-102.

Yabuuchi, N. et al. (2012). P2-type Nax [Fe1/2Mn1/2] O2 made from earth-abundant elements for rechargeable Na batteries. Nature materials, 11(6), 512-517.

First Office Action issued in connection with Chinese Application No. 201580026390.2, dated Jun. 23, 2017.

First Office Action issued in connection with Chinese Application No. 201580025425.0, dated Jun. 26, 2017.

Office Action issued in connection with U.S. Appl. No. 15/313,201, dated Nov. 3, 2017.

Final Office Action issued in connection with co-pending U.S. Appl. No. 15/313,201, dated Aug. 27, 2018 (7 pages).

Delmas, C., Fouassier, C., & Hagenmuller, P. "Structural classification and properties of the layered oxides." Physica B + C, 99(1) (1980), 81-85.

Gotoh, Kazuma, Toru Ishikawa, Saori Shimadzu, Naoaki Yabuuchi, Shinichi Komaba, Kazuyuki Takeda, Atsushi Goto et al. "NMR study for electrochemically inserted Na in hard carbon electrode of sodium ion battery." Journal of power sources 225 (2013): 137-140.

Komaba, S., Ishikawa, T., Yabuuchi, N., Murata, W., Ito, A., & Ohsawa, Y. (2011). "Fluorinated ethylene carbonate as electrolyte additive for rechargeable Na batteries." ACS applied materials & interfaces, 3(11) (2011), 4165-4168.

Komaba, Shinichi, Wataru Murata, Toru Ishikawa, Naoaki Yabuuchi, Tomoaki Ozeki, Tetsuri Nakayama, Atsushi Ogata, Kazuma Gotoh, and Kazuya Fujiwara. "Electrochemical Na insertion and solid electrolyte interphase for hard-carbon electrodes and application to Na-Ion batteries." Advanced Functional Materials 21 (2011): 3859-3867.

Komaba, Shinichi, Naoaki Yabuuchi, Tetsuri Nakayama, Atsushi Ogata, Toru Ishikawa, and Izumi Nakai. "Study on the Reversible Electrode Reaction of Na1-x Ni0. 5Mn0. 5O2 for a Rechargeable Sodium-Ion Battery." Inorganic chemistry 51, No. 11 (2012): 6211-6220.

Lu, Z., & Dahn, J. R. "Understanding the anomalous capacity of Li/Li [Ni x Li (1/3-2x/3) Mn (2/3-x/3)] O 2 cells using in situ X-ray diffraction and electrochemical studies." Journal of the Electrochemical Society, 149(7) (2002), A815-A822.

International Search Report and Written Opinion issued by the International Searching Authority for Application No. PCT/GB2015/050023 dated May 8, 2015, 12 pages.

International Preliminary Report on Patentability issued by the International Preliminary Examining Authority for Application No. PCT/GB2015/050023 dated Jan. 28, 2016, 6 pages.

Ado, et al., "Preparation of LiFeO$_2$ with Alpha-NaFeO$_2$-Type Structure Using a Mixed-Alkaline Hydrothermal Method", J. Electrochem. Soc., 1997, 144, L177.

Joachin, et al., "Electrochemical and Thermal Studies of Carbon-Coated LiFePO$_4$ Cathode", Journal of The Electrochemical Society, 2009, 156(6), A401-A406.

Komaba, et al., "Electrochemical intercalation activity of layered NaCrO$_2$ vs. LiCrO$_2$," Electrochemistry Communications, vol. 12, Issue 3, Mar. 2010, pp. 355-358.

Shakoor, et al., "Synthesis of NaFePO$_4$/NaCoPO$_4$ and their application to Sodium Batteries", Journal of the Korean Battery Society, vol. 3, No. 2, 2010, p. 1-4.

\* cited by examiner

DOPED NICKELATE COMPOUNDS

FIELD OF THE INVENTION

The present invention relates to certain novel doped nickelate-containing compounds, to a novel process for making doped nickelate-containing compounds, to electrodes containing doped nickelate-containing compounds, to the use of doped nickelate-containing compounds, for example in energy storage devices, to a process for storing electrical charge using a device comprising doped nickelate-containing compounds, and to energy storage devices, for example rechargeable batteries, comprising doped nickelate-containing compounds.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Meanwhile, charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

$NaNi_{0.5}Mn_{0.5}O_2$ is a known Na-ion material in which the nickel is present as $Ni^{2+}$ while the manganese is present as $Mn^{4+}$. The material is ordered with the Na and Ni atoms residing in discrete sites within the structure. The nickel ions ($Ni^{2+}$) are a redox element which contributes to the reversible specific capacity and the manganese ions ($Mn^{4+}$) play the role of a structure stabilizer. Compound $NaNi_{0.5}Ti_{0.5}O_2$ is analogous to $NaNi_{0.5}Mn_{0.5}O_2$ in that the $Ni^{2+}$ ions provide the active redox centre and the $Ti^{4+}$ ions are present for structure stabilization. There is plenty of literature describing the preparation of $NaNi_{0.5}Mn_{0.5}O_2$ (and to a lesser extent $NaNi_{0.5}Ti_{0.5}O_2$) as the precursor for making $LiNi_{0.5}Mn_{0.5}O_2$ and $LiNi_{0.5}Ti_{0.5}O_2$ by Na→Li ion exchange for Li-ion applications. A direct synthesis method to make these Li materials yields undesirable disordered materials, for example, as a result of the lithium and nickel atoms sharing structural sites. However, recent electrochemical studies reported by Komaba et al Adv. Funct. Mater. 2011, 21, 3859 describe the sodium insertion performance of hard-carbon and layered $NaNi_{0.5}Mn_{0.5}O_2$ electrodes in propylene carbonate electrolyte solutions. The results obtained show that although $NaNi_{0.5}Mn_{0.5}O_2$ exhibits some reversible charging and discharging ability, the capacity of the material fades by 25% or more, after only 40 cycles.

It is typically possible to predict the maximum charge capacity for sodium and lithium nickelate compounds based on the $Ni^{2+}$ to $Ni^{4+}$ redox process, however as Zhonghua Lu and J. R. Dahn, J. Electrochemical Society, 149 (7) A815-A822 (2002) explain, the electrochemical behaviour of cells made using lithium containing compounds, e.g. $Li[Ni_xLi_{(1/3-2x/3)}Mn_{(2/3-x/3)}]O_2$, where $x=\frac{1}{6}, \frac{1}{4}, \frac{1}{3}$ and $\frac{5}{12}$ do not always follow this conventional wisdom. These workers report that when cells containing lithium-nickelate materials are charged at voltages up to 4.45V, this causes lithium to be removed until the Mn oxidation state reaches 4+; thus giving an expected charge capacity of 2x. However, when lithium cells where $x<\frac{1}{2}$ are charged to higher voltages, e.g. between 4.5 and 4.7V, they exhibit a long plateau approximately corresponding to 1-2x and subsequent to this plateau, these materials reversibly cycle at capacities over 225 mAh/g. Put simply, lithium-containing compounds of the formula $Li[Ni_xLi_{(1/3-2x/3)}Mn_{(2/3-x/3)}]O_2$ where the amount of nickel is less than 0.5, exhibit a significantly higher charge capacity than would be expected from conventional theoretical calculation. By contrast, Lu and Dahn note that a similar increase in charge capacity is not observed when x=0.5, i.e. $LiNi_{0.5}Mn_{0.5}O_2$, as there is sufficient nickel present to remove all of the lithium. To explain the higher than expected charge capacity phenomenon, Lu and Dahn demonstrated that their lithium materials undergo a non-reversible loss of oxygen when they are charged to higher voltages, and these oxygen deficient materials then react reversibly with lithium. Notwithstanding this, although this increased charge capacity is a potentially interesting discovery, the commercial utility of such compounds is hindered by the high cost of lithium, as discussed above.

US2007/0218361 teaches a sodium ion secondary battery which comprises a positive electrode active material which includes a sodium-containing transition metal oxide $Na_aLi_bM_xO_{2\pm\alpha}$. The M includes at least two of manganese, iron, cobalt and nickel. In such materials it is apparently extremely important that the amount of sodium is neither too large (otherwise excess sodium oxide or sodium hydride is produced which causes the positive electrode to become highly moisture absorptive) nor too small. In the latter case the amount of sodium ions that can be intercalated and de-intercalated is said to be reduced and this results in not being able to obtain a high discharge capacity. This prior art describes that the optimum amount of sodium, i.e. the value of a, is preferably 0.6 to 1.1, further preferably 0.9 to 1.1 and more preferably 1. Meanwhile the amount of oxygen is also described as critical to performance. Too much oxygen is said to occupy transition metal and/or alkaline metal sites, and presumably this will hinder re-intercalation of the sodium ions during charge/discharge. Too little oxygen is said to produce material with a crystal structure with lots of defects. The optimum range for a is from 0 to 0.1. Another feature of the specific examples described in US2007/0218361 is that they all contain manganese in oxidation state +3. This is to allow sodium extraction by a manganese oxidation process ($Mn^{+3} \rightarrow Mn^{4+}$).

The present invention aims to provide novel doped nickelate-containing compounds that are capable of achieving a considerably higher specific charge capacity than would be expected from conventional theoretical calculations. The doped nickelate-containing compounds of the present invention may be used to provide an electrode which is able to be recharged multiple times without significant loss in charge capacity. In particular the doped nickelate-containing compounds of the present invention will provide an energy storage device for example a battery for use in a sodium-ion cell or a sodium metal cell. The present invention also provides a process for storing electrical charge using electrodes comprising one or more of the doped nickelate-containing compounds of the present invention. Further, the present invention provides a process for making doped nickelate-containing compounds, which is extremely straightforward and cost effective to carry out.

The doped nickelate-containing compounds of the present invention comprise the general formula:

$$A_aM^1{}_vM^2{}_wM^3{}_xM^4{}_yM^5{}_zO_{2-c}$$

wherein
A comprises either sodium or a mixed alkali metal in which sodium is the major constituent;
$M^1$ is nickel in oxidation state greater than 0 to less than or equal to 4+,
$M^2$ comprises a metal in oxidation state greater than 0 to less than or equal to 4+,
$M^3$ comprises a metal in oxidation state 2+,
$M^4$ comprises a metal in oxidation state greater than 0 to less than or equal to 4+, and
$M^5$ comprises a metal in oxidation state 3+
wherein
0≤a<1, preferably 0≤a<0.6, and further preferably 0.2≤a<1, or 0.2≤a<0.6
v>0, preferably 0<v<0.5
at least one of w and y is >0
x≥0, preferably x>0
z≥0
wherein c is determined by a condition selected from 0<c≤0.1 and 0.05≤c≤0.1
wherein (a, v, w, x, y, z and c) are chosen to maintain electroneutrality.

Preferred doped nickelate-containing compounds of the present invention comprise the general formula:

$$A_aM^1{}_vM^2{}_wM^3{}_xM^4{}_yM^5{}_zO_{2-c}$$

wherein
A comprises either sodium or a mixed alkali metal in which sodium is the major constituent;
$M^1$ is nickel in oxidation state less than 4+,
$M^2$ comprises a metal in oxidation state greater than 0 to less than or equal to 4+,
$M^3$ comprises a metal in oxidation state 2+,
$M^4$ comprises a metal in oxidation state greater than 0 to less than or equal to 4+, and
$M^5$ comprises a metal in oxidation state 3+
wherein
0≤a<1, preferably 0≤a<0.6, further preferably 0≤a≤0.5
v>0, preferably 0<v<0.5
at least one of w and y is >0
x≥0, preferably x>0
z≥0
wherein c is determined by a condition selected from 0<c≤0.1 and 0.05≤c≤0.1
wherein (a, v, w, x, y, z and c) are chosen to maintain electroneutrality.

Particularly preferred doped nickelate-containing compounds of the present invention comprise the formula:

$$A_aM^1{}_vM^2{}_wM^3{}_xM^4{}_yM^5{}_zO_{2-c}$$

wherein
A comprises either sodium or a mixed alkali metal in which sodium is the major constituent;
$M^1$ is nickel in oxidation state 4+,
$M^2$ comprises a metal in oxidation state 4+,
$M^3$ comprises a metal in oxidation state 2+,
$M^4$ comprises a metal in oxidation state 4+, and
$M^5$ comprises a metal in oxidation state 3+
wherein
0≤a<1, preferably 0≤a<0.6, further preferably 0≤a≤0.5
v>0, preferably 0<v<0.5
at least one of w and y is >0
x≥0, preferably x>0
z≥0
wherein c is determined by a condition selected from 0<c≤0.1 and 0.05≤c≤0.1
wherein (a, v, w, x, y, z and c) are chosen to maintain electroneutrality.

Metals $M^2$ and $M^4$ may be the same or a different metal in oxidation state greater than 0 to less than or equal to 4+. Moreover $M^2$ and $M^4$ are interchangeable with each other. When $M^2=M^4$ then the doped nickelate-containing compounds of the present invention may be written either as:

$$A_aM^1{}_VM^2{}_WM^3{}_XM^4{}_YM^5{}_ZO_{2-c},$$

or $$A_aM^1{}_VM^2{}_{W+Y}M^3{}_XM^5{}_ZO_{2-c},$$

or $$A_aM^1{}_VM^3{}_XM^4{}_{Y+W}M^5{}_XO_{2-c},$$

and all of these forms of the equation are to be regarded as equivalent.

Especially preferred doped nickelate-containing compounds of the present invention comprise the formula:

$$A_aM^1{}_vM^2{}_xM^3{}_xM^4{}_yO_{2-c}$$

wherein
0≤a<1; preferably 0≤a<0.6, further preferably 0≤a≤0.5, advantageously 0≤a≤0.4, highly preferably 0.1≤a<0.6 and conveniently 0.2≤a<1;
v>0, preferably 0<v<0.5;
at least one of w and y is in the range greater than 0 to less than or equal to 0.5 (i.e. 0<w and/or y≤0.5);
0≤x<0.5; preferably 0<x<0.5;
z≥0; and
wherein c is determined by a condition selected from 0<c≤0.1 and 0.05≤c≤0.1,
wherein a, v, w, x, y, z and c are chosen to maintain electroneutrality.

The doped nickelate-containing compounds of the present invention preferably comprise sodium alone as the chosen alkali metal.

Also, in further preferred doped nickelate-containing compounds of the present invention, $M^2$ comprises a metal selected from one or more of tin, manganese, titanium and zirconium; $M^3$ comprises a metal selected from one or more of magnesium, calcium, copper, zinc and cobalt; $M^4$ comprises a metal selected from one or more of tin, manganese, titanium and zirconium; and $M^5$ comprises a metal selected from one or more of aluminium, iron, cobalt, molybdenum, chromium, vanadium, scandium and yttrium.

In a highly preferred doped nickelate-containing compound of the present invention, (v+w)<0.8, especially when $M^2$=Mn and/or Ti.

Advantageous doped nickelate-containing compounds include:
$Ni_{0.308}Mn_{0.308}Mg_{0.154}Ti_{0.229}O_{2-c}$
$Ni_{0.3}Mn_{0.3}Mg_{0.15}Ti_{0.25}O_{2-c}$
$Ni_{0.283}Mn_{0.283}Mg_{0.142}Ti_{0.292}O_{2-c}$
$Na_{0.2}Ni_{0.308}Mn_{0.308}Mg_{0.154}Ti_{0.229}O_{2-c}$
$Na_{0.2}Ni_{0.3}Mn_{0.3}Mg_{0.15}Ti_{0.25}O_{2-c}$ $Na_{0.2}Ni_{0.283}Mn_{0.283}Mg_{0.142}Ti_{0.292}O_{2-c}$
$Ni_{0.325}Mn_{0.325}Mg_{0.1625}Ti_{0.1875}O_{2-c}$
$Na_{0.2}Ni_{0.325}Mn_{0.325}Mg_{0.1625}Ti_{0.1875}O_{2-c}$.
$Na_{0.2}Ni_{0.317}Mn_{0.467}Mg_{0.1}Ti_{0.117}O_{2-c}$
and
$Ni_{0.317}Mn_{0.467}Mg_{0.1}Ti_{0.117}O_{2-c}$.

The most preferred doped nickelate-containing compounds are:
$Ni_{0.3167}Mn_{0.3167}M^3_{0.1583}Ti_{0.2083}O_{2-c}$,
$Na_{0.2}Ni_{0.3167}Mn_{0.3167}M^3_{0.1583}Ti_{0.2083}O_{2-c}$,
$Ni_{0.3167}Mn_{0.3167}Mg_{0.1583}Ti_{0.2083}O_{2-c}$
and
$Na_{0.2}Ni_{0.3167}Mn_{0.3167}Mg_{0.1583}Ti_{0.2083}O_{2-c}$.

In all of the above compounds of the present invention, c is in the range $0<c\leq0.1$.

The doped nickelate-containing compounds of the present invention may be made using any convenient method such as a chemical process. For example, appropriate starting materials may be mixed together and heated in the presence or absence of a solvent (the latter being a solid state process). The choice and amount of each starting material is preferably selected to provide the elements present in the required doped nickelate-containing compound, and preferably the required doped nickelate-containing compound is formed substantially in the absence of side reaction products and unreacted starting materials.

Alternatively, doped nickelate-containing compounds according to the invention may be formed using a process comprising the step of charging an electrochemical cell containing one or more compounds of Formula 1 (described below) beyond their conventional theoretical specific capacity as determined by the $Ni^{2+}/Ni^{4+}$ redox couple, wherein Formula 1 is defined as $$A'_a M^{1'}_v M^{2'}_w M^{3'}_x M^{4'}_y M^{5'}_z O_2 \quad \text{(Formula 1)}$$

wherein
A' comprises either sodium or a mixed alkali metal in which sodium is the major constituent;
$M^{1'}$ is nickel in oxidation state 2+,
$M^{2'}$ comprises a metal in oxidation state 4+,
$M^{3'}$ comprises a metal in oxidation state 2+,
$M^{4'}$ comprises a metal in oxidation state 4+, and
$M^{5'}$ comprises a metal in oxidation state 3+
$0<a'<1$; preferably $0.5<a'<1$; conveniently $0.8<a'<1$, advantageously $0.833\leq a'<1$ and most preferably $0.85\leq a'<1$;
$0<v'<0.5$;
at least one of w' and y' is >0; preferably the range $0<(w'$ and/or $y')\leq0.5$;
$0\leq x'\leq0.5$;
$z'\geq0$;
and wherein a', v', w', x', y' and z' are all chosen to maintain electroneutrality.

Compounds of Formula 1 preferably comprise sodium alone as the chosen alkali metal.

Also in further preferred compounds of Formula 1, $M^{2'}$ comprises a metal selected from one or more of tin, manganese, titanium and zirconium; $M^{3'}$ comprises a metal selected from one or more of magnesium, calcium, copper, zinc and cobalt; $M^{4'}$ comprises a metal selected from one or more of tin, manganese, titanium and zirconium; and $M^{5'}$ comprises a metal selected from one or more of aluminium, iron, cobalt, molybdenum, chromium, vanadium, scandium and yttrium.

A', $M^{1'}$, $M^{2'}$, $M^{3'}$, $M^{4'}$, $M^{5'}$, a', v', w', x', y' and z' in a compound of Formula 1 correspond with A, $M^1$, $M^2$, $M^3$, $M^4$, $M^5$, a, v, w, x, y and z respectively in a doped nickelate compound produced by the process of the present invention.

Especially preferred compounds of Formula 1 include:
$Na_{0.975}Ni_{0.325}Mn_{0.325}Mg_{0.1625}Ti_{0.1875}O_2$
$Na_{0.95}Ni_{0.3167}Mn_{0.3167}Mg_{0.1583}Ti_{0.2083}O_2$
$Na_{0.925}Ni_{0.308}Mn_{0.308}Mg_{0.1541}Ti_{0.229}O_2$
$Na_{0.9}Ni_{0.3}Mn_{0.3}Mg_{0.15}Ti_{0.25}O_2$
$Na_{0.85}Ni_{0.283}Mn_{0.283}Mg_{0.142}Ti_{0.292}O_2$
$Na_{0.833}Ni_{0.317}Mn_{0.467}Mg_{0.1}Ti_{0.117}O_2$
$Na_{0.8}Ni_{0.0.267}Mn_{0.267}Mg_{0.133}Ti_{0.333}O_2$
$Na_{0.75}Ni_{0.25}Mn_{0.25}Mg_{0.125}Ti_{0.375}O_2$
$Na_{0.7}Ni_{0.233}Mn_{0.233}Mg_{0.117}Ti_{0.417}O_2$
$Na_{0.667}Ni_{0.222}Mn_{0.2222}Mg_{0.111}Ti_{0.444}O_2$ In preferred embodiments, such as in the above compounds according to Formula 1, all of the Ni is in oxidation state 2+ and all of the Mn is in oxidation state 4+.

The step of charging an electrochemical cell containing one or more compounds of Formula 1 beyond the conventional theoretical specific capacity as determined by the $Ni^{2+}/Ni^{4+}$ redox couple is typically accompanied by the loss of oxygen from one or more of the compounds of Formula 1, thus the resulting product i.e. the doped nickelate-containing compounds produced thereby may be described to be "oxygen deficient" relative to the compounds of Formula 1. The compounds of Formula 1 are also referred to herein as "active cathode compounds".

Thus, a desirable process of the present invention comprises the step of causing at least a partial loss of oxygen from a compound of Formula 1 by overcharging them, that is, by charging them to a specific capacity greater than the conventional theoretical capacity based on the oxidation of $Ni^{2+}$ to $Ni^{4+}$. Typically this means charging an electrochemical cell (e.g. the Na-ion electrochemical cell) containing one or more compounds of Formula 1, to at least 4.0V but the actual voltage required will vary slightly for each material. Preferably the overcharging step is the first charge performed on the compounds of Formula 1. However, it is also possible that the overcharging step, and the consequent at least partial oxygen loss, may be realised over several charging steps in order to achieve the required oxygen-deficient doped nickelate-containing compounds of the present invention. In a further embodiment of the present invention, the compounds of Formula 1 may have the structure $A'_a M^{1'}_v M^{2'}_w M^{3'}_x M^{4'}_y M^{5'}_z O_{2\pm\delta}$, in which A', a', $M^{1'}$, v', $M^{2'}$, w', $M^{3'}$, x' $M^{4'}$, y', $M^{5'}$ and z' are the same as defined above, and $O_{2\pm\delta}$ means that this Formula 1 compound is either oxygen rich or oxygen deficient before it is overcharged in the process of the present invention and becomes oxygen deficient or yet more oxygen deficient (respectively depending on whether we start from $O_{2+\delta}$ or $O_{2-\delta}$). The amount of oxygen in $A'_a M^{1'}_v M^{2'}_w M^{3'}_x M^{4'}_y M^{5'}_z O_{2\pm\delta}$ will be higher than the amount of oxygen present in the compounds of the present invention i.e. $A_a M^1_v M^2_w M^3_x M^4_y M^5_z O_{2-c}$.

In line with what would expected from the prior art, charging doped sodium nickelate compounds of Formula 1 up to their conventional theoretical capacity causes the oxidation of $Ni^{2+}$ to $Ni^{4+}$ and the removal of at least a portion of the sodium ions from the lattice; this process is reversible and the compounds of Formula 1 will be obtained again upon discharge. By contrast, the process of the present invention which comprises charging such compounds above their conventional theoretical capacity, i.e. "overcharging" them, is an irreversible process which produces doped nickelate-containing compounds including the doped nickelate-containing compounds of the present invention.

Not wishing to be bound by any particular theory, the Applicant currently understands that the enhanced charge capacity (or anomalous charge capacity) observed when compounds of Formula 1 are "overcharged" during the process of the present invention, is due to several changes that occur as the overcharging is taking place. Broadly speaking this is a combination of i) the conventional (or "normal") charge process that uses just the oxidation of $Ni^{2+}$ to $Ni^{4+}$, together with ii) other structural changes that occur exclusively at the higher voltages, such as the removal of a higher than expected (from conventional theory) number of alkali metal ions, e.g. sodium ions, which is typically accompanied by an irreversible partial loss of oxygen to yield $O_{2-c}$-containing active materials.

The present invention therefore provides a process of producing doped nickelate-containing compounds with an increased specific charge capacity than would be expected (as explained above), comprising the steps of i) forming an electrochemical cell (e.g. a Na-ion electrochemical cell) comprising at least one compound of Formula 1, and ii) charging the resulting electrochemical cell above the conventional theoretical capacity based on the oxidation of $Ni^{2+}/Ni^{4+}$ to thereby produce at least one doped nickelate-containing compound of the present invention with a specific charge capacity that is higher than expected based on the conventional theoretical charge capacity.

As described above the overcharging process is typically accompanied by at least a partial loss of oxygen, therefore the present invention also provides a process for providing oxygen deficient doped nickelate-containing compounds of the present invention comprising:
i) forming an electrochemical cell, e.g. a Na-ion electrochemical cell, comprising at least one compound of Formula 1; and
ii) charging the resulting electrochemical cell (Na-ion electrochemical cell) above the theoretical capacity based on $Ni^{2+}/Ni^{4+}$ to cause the loss of oxygen from the compound of Formula 1 and thereby form adoped nickelate-containing compound that is oxygen deficient.

The mechanism by which oxygen is lost from the compounds of Formula 1 during an overcharging process operates most efficiently when the compounds of Formula 1 comprise layered structures. Layered $A_xMO_2$ materials are known to adopt several, very similar structural types, the most well-known of which have been categorised by Delmas et al. *Physica B+C*, 91, (1980), 81, as "O3, P2 and P3". These notations describe the stacking of the layers; the letter refers to the way in which the oxygen ions are coordinated to the alkali ions, with the letter O denoting an octahedral coordination and the letter P denoting a prismatic coordination. The number refers to the number of $MO_2$ layers contained in the unit cell. In the case of the uncharged active cathode compounds of Formula 1, it is preferred that they generally adopt a layered α-NaFeO$_2$ type structure (space group R-3m, no. 166), which has an O3-type crystal structure, although the precise structure will be influenced by the composition of the compound being formed as well as the synthesis conditions. Following charging, these materials are thought to adopt O3, P2 or P3 or modified versions of these crystal structures, although it is also possible that other crystal structures may be adopted.

The Applicant has demonstrated in Example 7 in the Specific Examples below that when the layered active cathode compounds of Formula 1, are overcharged in an electrochemical cell (e.g. a Na-ion electrochemical cell), they undergo a structural change, which produces a reduction in the volume of the unit cell as compared with both the pristine precursor material, e.g. compounds of Formula 1 before charging, and after charging to their conventional theoretical capacities, e.g. based on $Ni^{2+}$ to $Ni^{4+}$. It is believed that such unit cell volume reduction is consistent with the loss of alkali metal-ions and at least partial oxygen loss. Another characteristic of overcharged oxide-containing cathode compounds is that they appear to lose crystallinity (compared with the uncharged material).

A determination of when a material is said to be "overcharged" is made by observing the voltage curve for the particular material. At capacities less than or close to the conventional theoretical maximum charge capacity (i.e. the $Ni^{2+}/Ni^{4+}$ redox couple) a first voltage feature is seen. However the curve continues to rise to a second voltage feature upon further or "over" charging. The materials are said to be "overcharged" from the beginning of this second voltage feature.

Therefore the present invention provides a process of increasing the specific charge capacity of a compound according to Formula 1 comprising forming an electrochemical cell, e.g. a sodium ion electrochemical cell; charging the electrochemical cell (sodium ion cell) and compound according to Formula 1 onto at least a portion of a voltage feature which is observed as a result of the compound of Formula 1 being charged above the conventional theoretical maximum charge capacity. "Charging" in the process of the present invention may be carried out as a single charging process in which the compound of Formula 1 undergoes a single charge to beyond the theoretical maximum charge capacity based on $Ni^{2+}$ to $Ni^{4+}$ oxidation, or alternatively may involve two or more consecutive stages. In the latter case "charging" may include one or more earlier or first stages in which one or more compounds of Formula 1 are charged in one or more earlier or first charging operations to a charge capacity below or equivalent to its conventional theoretical maximum charge capacity based on $Ni^{2+}$ to $Ni^{4+}$ oxidation, followed by one or more later or second stages in which the compound from the earlier or first stage is charged in one or more later of second charging operations to beyond the theoretical maximum charge capacity based on $Ni^{2+}$ to $Ni^{4+}$ oxidation. Alternatively, the compound of Formula 1 may be charged in one or more charging operations to beyond the theoretical maximum charge without first undergoing one or more first charging operations to a charge capacity below or equivalent to its theoretical maximum.

In a further embodiment, the present invention also provides a process of increasing the specific charge capacity of an oxide-containing cathode compound according to Formula 1 in an electrochemical cell, e.g. a Na-ion electrochemical cell, comprising:
a) charging the electrochemical cell (sodium-ion electrochemical cell) comprising one or more compounds of Formula 1 beyond the conventional theoretical capacity of the cathode based on the $Ni^{2+}/Ni^{4+}$ redox couple; and optionally
b) degassing the electrochemical cell (Na-ion electrochemical cell) to remove gasses formed during the charging process.

As described above, the charging step may be performed as a single- or a multi-stage process.

A doped nickelate of Formula 1 that is charged up to its theoretical specific capacity limit based on the $Ni^{2+}/Ni^{4+}$ redox couple, will re-yield a compound with no oxygen loss when discharged; i.e. at this level, charging is seen to be reversible. However, discharging compounds of Formula 1 that have been "overcharged" in accordance with the process of the present invention typically results in producing doped nickelate compounds of the present invention in which M$^1$ is nickel in oxidation state greater than 0 to less than 4+, at least one of M$^2$ and M$^4$ comprises a metal in oxidation state greater than 0 to less than or equal to 4+, 0<a<1

0<v<0.5 and

0<c≤0.1 and preferably 0.05≤c≤0.1.

Consequently, during the discharge of over-charged compounds of Formula 1 at least some of the nickel is reduced from oxidation state 4+ to oxidation state 2+, some or all of the sodium-ions are re-inserted into the lattice and the lost oxygen atoms are not replaced. Moreover, although the metals M$^{2'}$ and/or M$^{4'}$ do not contribute anything to the initial overcharging process, upon discharge of the overcharged material it is found that at least one of the metals M$^{2'}$ and/or M$^{4'}$ can also be reduced to an oxidation state greater than 0 to less than 4+. This allows some or all of the sodium ions that were removed during the first "overcharge" to be reinserted into the material, and therefore produces a material with a higher discharge capacity. It is clear from this description that the intended role of the Mn$^{4+}$ (or Ti$^{4+}$) in the uncharged materials of the present invention is to allow for the reduction (Na insertion) process during cell discharge. This is in direct contrast to the role of the manganese in US2007/0218361 which is to allow Na extraction by the Mn oxidation process Mn$^{3+}$→Mn$^{4+}$ during the first charge process.

The role of the M$^{3'}$ and M$^{5'}$ metals is to reduce the amount of nickel in the doped nickelate materials of Formula 1, thereby allowing the "overcharge" mechanism to take place as oxygen is released from the structure. The presence of the M$^{3'}$ and M$^{5'}$ metals also reduces the relative formula mass (formula weight) of these materials, thereby further improving the cost effectiveness of the electrode materials. In order to achieve anomalous capacity, there must be over twice the amount of sodium as there is nickel in the pristine materials (e.g. Formula 1) so that, when all Ni$^{2+}$ has oxidised to Ni$^{4+}$, there is still some Na left in the material, which can then be removed when the material is overcharged. This explains why anomalous capacity is not observed for NaNi$_{0.5}$Mn$_{0.5}$O$_2$; in this case there is enough Ni$^{2+}$ present to remove all of the Na, by conventional Ni$^{2+}$ to Ni$^{4+}$ oxidation. In each of the compounds of Formula 1 a' is <1, and following the requirement above, v' (i.e. the amount of nickel) has to be less than half the value of a' (i.e. the amount of alkali metal) and the overall material must be electroneutral. Satisfaction of these two conditions is facilitated by the presence of an M$^{3'}$ metal, and/or an M$^{5'}$ metal.

The doped nickelate-containing compounds made by the process of the present invention described above, may be cycled in an electrochemical cell (e.g. a Na-ion electrochemical cell) between normal voltage limits for the Ni$^{2+}$/Ni$^{4+}$ redox couple, typically this might be expected to be between 1 and 4 V, and no further unconventional voltage plateaux are formed. However, once formed, cycling the doped nickelate-containing compounds of the present invention at normal voltage limits maintains a higher specific capacity than would be expected from conventional theoretical calculations, i.e. the doped nickelate-containing compounds of the present invention perform better than the pristine compounds of Formula 1 when cycled using the same normal voltage limits.

Thus the present invention provides a process of using one or more doped nickelate-containing compounds of the present invention, in an electrochemical cell (e.g. a Na-ion electrochemical cell) said process comprises the step of cycling the electrochemical cell (Na-ion electrochemical cell) containing the one or more doped nickelate-containing compounds of the present invention, over a voltage range within the normal voltage limits of the Ni$^{2+}$/Ni$^{4+}$ redox couple; wherein the electrochemical cell (Na-ion electrochemical cell) is optionally degassed to remove gasses formed during the charging process.

The doped nickelate-containing compounds of the present invention are suitable for use in many different applications including electrochemical cells, e.g. sodium ion electrochemical cells, which may be widely used for example in energy storage devices, such as batteries, rechargeable batteries, electrochemical devices and electrochromic devices.

The process of the present invention for making doped nickelate-containing compounds is conveniently performed in situ in an energy storage device, a battery, a rechargeable battery, an electrochemical device or an electrochromic device.

The present invention also provides the use of one or more doped nickelate-containing compounds of the present invention in energy storage devices including batteries, particularly rechargeable batteries, in electrochemical devices and electrochromic devices. Further, the present invention provides a process of storing electrical charge using energy storage devices including batteries, rechargeable batteries, electrochemical devices and electrochromic devices, comprising one or more doped nickelate-containing compounds of the present invention.

The present invention also provides energy storage devices, including batteries, rechargeable batteries, electrochemical devices and electrochromic devices comprising one or more doped nickelate-containing compounds of the present invention, and also includes methods of making and using such energy storage devices.

In a further alternative process for the preparation of doped nickelate-containing compounds of the present invention, at least a partial loss of oxygen from the materials of Formula 1 may be facilitated using an agent such as NO$_2$BF$_4$, NO$_2$PF$_6$, bromine in methanol or persulfates such as potassium persulfate or ammonium sulphate.

Advantageously, electrodes comprising one or more doped nickelate-containing compounds of the present invention are used in conjunction with a counter electrode and one or more electrolyte materials. The electrolyte materials may be any conventional or known materials and may comprise either aqueous electrolyte(s) or non-aqueous electrolyte(s).

It is also possible to convert sodium-ion derivatives into mixed lithium-ion/sodium-ion materials using an ion exchange process.

Typical ways to achieve Na to Li-ion exchange include:
1. Mixing the sodium-ion material with a lithium-containing material e.g. LiNO$_3$, heating to above the melting point of LiNO$_3$ (264° C.), cooling and then washing to remove the excess LiNO$_3$ and side-reaction product
2. Treating the Na-ion material with an aqueous solution of lithium salts, for example 1M LiCl in water; and
3. Treating the Na-ion material with a non-aqueous solution of lithium salts, for example LiBr in one or more aliphatic alcohols such as hexanol, propanol etc.

BRIEF DESCRIPTION OF THE DRAWINGS

The present invention will now be described with reference to the following figures in which.

DETAILED DESCRIPTION

Figure 1A:
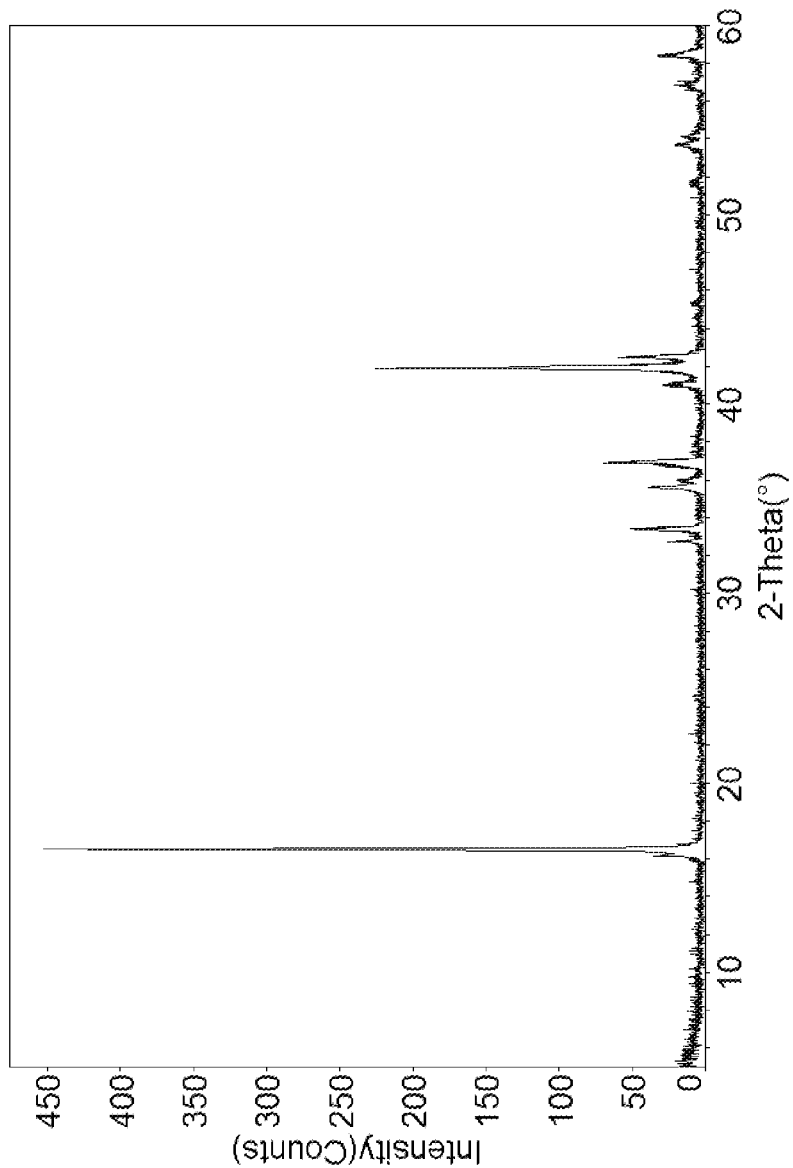
FIG. 1(A) is the XRD profile for the compound NaNi$_{0.5}$Mn$_{0.5}$O$_2$ used in comparative Example 1.

Any convenient process may be used to make the compounds of Formula 1 described above. For example, the following general method may be used:

General Method:
1) Intimately mix together the starting materials in the correct stoichiometric ratio, to ensure that the required product is formed and ideally with the minimum amount of side reactions and unreacted starting materials, and press into a pellet.
2) Heat the resulting mixture in a furnace using either an ambient air atmosphere, or a flowing inert atmosphere (e.g. argon or nitrogen), at a furnace temperature of between 400° C. and 1500° C. until reaction product forms.
3) Allow the product to cool before grinding it to a powder.

Table 1 below lists the starting materials and heating conditions used to prepare a comparative compound $NaNi_{0.5}Mn_{0.5}O_2$ (Example 1) and compounds of Formula 1 (Examples 2 to 6).

rechargeable battery applications. However, the present invention has surprisingly demonstrated that when these sodium-based materials are overcharged they yield materials which are highly thermodynamically stable and which are extremely effective and safer when used as cathode materials in electrochemical cells (e.g. Na-ion electrochemical cells).

Product Analysis Using XRD

Analysis by X-ray diffraction techniques was conducted using a Siemens D5000 powder diffractometer to confirm that the desired target materials had been prepared, to establish the phase purity of the product material and to determine the types of impurities present. From this information it is possible to determine the unit cell lattice parameters.

The general XRD operating conditions used to analyse the materials are as follows:
Slits sizes: 1 mm, 1 mm, 0.1 mm
Range: $2\theta = 5°\text{-}60°$
X-ray Wavelength=1.5418 Å (Angstroms) (Cu Kα)
Speed: 1.0 seconds/step
Increment: 0.025°

TABLE 1

| COMPOUND | | STARTING MATERIALS | FURNACE CONDITIONS |
|---|---|---|---|
| 1 | COMPARATIVE | | |
| | $NaNi_{0.5}Mn_{0.5}O_2$ | 0.5 $Na_2CO_3$<br>0.5 $NiCO_3$<br>0.5 $MnO_2$ | 1) Air/900° C., dwell time of 8 hours.<br>2) Air/900° C., dwell time of 8 hours. |
| | COMPOUNDS OF FORMULA 1 | | |
| 2 | $Na_{0.95}Ni_{0.3167}Mn_{0.3167}Mg_{0.1583}Ti_{0.2083}O_2$ | 0.475 $Na_2CO_3$<br>0.3167 $NiCO_3$<br>0.3167 $MnO_2$<br>0.1583 $Mg(OH)_2$<br>0.2083 $TiO_2$ | 1) Air/900° C., dwell time of 8 hours. |
| 3 | $Na_{0.925}Ni_{0.308}Mn_{0.308}Mg_{0.154}Ti_{0.229}O_2$ | 0.463 $Na_2CO_3$<br>0.308 $NiCO_3$<br>0.308 $MnO_2$<br>0.154 $Mg(OH)_2$<br>0.229 $TiO_2$ | 1) Air/900° C., dwell time of 10 hours. |
| 4 | $Na_{0.9}Ni_{0.30}Mn_{0.30}Mg_{0.150}Ti_{0.25}O_2$ | 0.45 $Na_2CO_3$<br>0.3 $NiCO_3$<br>0.3 $MnO_2$<br>0.15 $Mg(OH)_2$<br>0.25 $TiO_2$ | 1) Air/900° C., dwell time of 10 hours |
| 5 | $Na_{0.85}Ni_{0.283}Mn_{0.283}Mg_{0.142}Ti_{0.292}O_2$ | 0.425 $Na_2CO_3$<br>0.283 $NiCO_3$<br>0.283 $MnO_2$<br>0.142 $Mg(OH)_2$<br>0.292 $TiO_2$ | 1) Air/900° C., dwell time of 10 hours |
| 6 | $Na_{0.833}Ni_{0.317}Mn_{0.467}Mg_{0.1}Ti_{0.117}O_2$ | 0.833 $Na_2CO_3$<br>0.317 $NiCO_3$<br>0.467 $TiO_2$,<br>0.1 $Mg(OH)_2$<br>0.117 $MnO_2$ | 1) Air/900° C., dwell time of 10 hours |

It is desirable for electrode materials to be safe during charge and discharge in an energy storage device. Li-ion batteries in common use today undergo safety/abuse testing, the results of such tests revealing that lithium oxide-based cathode materials are liable to liberate oxygen, which is a major contributing factor to an undesirable process known as thermal runaway. Prior to the present invention it might have been expected that a similar thermal runaway process would also be observed for sodium oxide-based materials, and that such sodium oxide-based materials would be unsafe and/or rendered completely useless by overcharging in Electrochemical Results The target materials were tested using a Na-ion test cell using a hard carbon anode. Cells may be made using the following procedures:

A Na-ion electrochemical test cell containing the active material is constructed as follows:

Generic Procedure to Make a Hard Carbon Na-Ion Cell

The positive electrode is prepared by solvent-casting a slurry of the active material, conductive carbon, binder and solvent. The conductive carbon used is Super P (Timcal). PVdF is used as the binder, and N-Methyl-2-pyrrolidone (NMP) is employed as the solvent. The slurry is then cast onto aluminium foil and heated until most of the solvent evaporates and an electrode film is formed. The electrode is then dried under dynamic vacuum at about 120° C. The electrode film contains the following components, expressed in percent by weight: 88% active material, 6% Super P carbon, and 6% PVdF binder.

The negative electrode is prepared by solvent-casting a slurry of the hard carbon active material (Carbotron P/J, supplied by Kureha), conductive carbon, binder and solvent. The conductive carbon used is Super P (Timcal). PVdF is used as the binder, and N-Methyl-2-pyrrolidone (NMP) is employed as the solvent. The slurry is then cast onto aluminium foil and heated until most of the solvent evaporates and an electrode film is formed. The electrode is then dried further under dynamic vacuum at about 120° C. The electrode film contains the following components, expressed in percent by weight: 89% active material, 2% Super P carbon, and 9% PVdF binder.

Cell Testing

The cells are tested as follows, using Constant Current Cycling techniques.

The cell is cycled at a given current density between pre-set voltage limits. A commercial battery cycler from Maccor Inc. (Tulsa, Okla., USA) is used. On charge, alkali ions are extracted from the cathode active material. During discharge, alkali ions are re-inserted into the cathode active material.

Convenient Method for Overcharging the Electrochemical Cells

The cell is charged under constant current conditions to a pre-set cell voltage limit, typically 4.2V. At the end of this constant current stage, the cell is further charged at a constant voltage (CV—potentiostatic) (typically 4.2V) until the cell current drops to less than 1% of the constant current value. This CV step ensures that the cell is fully charged. Following this charging process the cell is discharged to a lower pre-set voltage limit (typically 1.0V).

Example 1

Comparative Compound $NaNi_{0.5}Mn_{0.5}O_2$

In this comparative Example, it is shown that no anomalous capacity behaviour is observed when the process of the present invention is performed on $NaNi_{0.5}Mn_{0.5}O_2$. This is because the [Ni] activity is sufficient to allow (theoretically) all of the Na to be extracted using the $Ni^{2+}/Ni^{4+}$ oxidation process. As FIGS. 1(B) to 1(E) illustrate and as explained below, no anomalous capacity is observed for this compound when an electrochemical cell containing it is charged beyond the conventional theoretical specific capacity as determined by the $Ni^{2+}/Ni^{4+}$ redox couple.

A Hard Carbon//$NaNi_{0.5}Mn_{0.5}O_2$ cell was prepared as follows, charged to 4V and held potentiostatically (constant voltage step) at 4V. The data shown in FIGS. 1(B) to 1(E) are derived from the constant current cycling data for a $NaNi_{0.5}Mn_{0.5}O_2$ compound in a Na-ion cell (Cell #204056) where this cathode material was coupled with a capacity balanced Hard Carbon (Carbotron P/J) anode material. The electrolyte used was a 0.5 M solution of $NaClO_4$ in propylene carbonate. The constant current data were collected at an approximate current density of 0.1 mA/cm$^2$ between voltage limits of 1.50 and 4.00 V. To fully charge the cell the Na-ion cell was potentiostatically held at 4.0 V at the end of the constant current charging process until the current dropped to less than 1% of the constant current value. The cell testing was carried out at 30° C. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 1B:
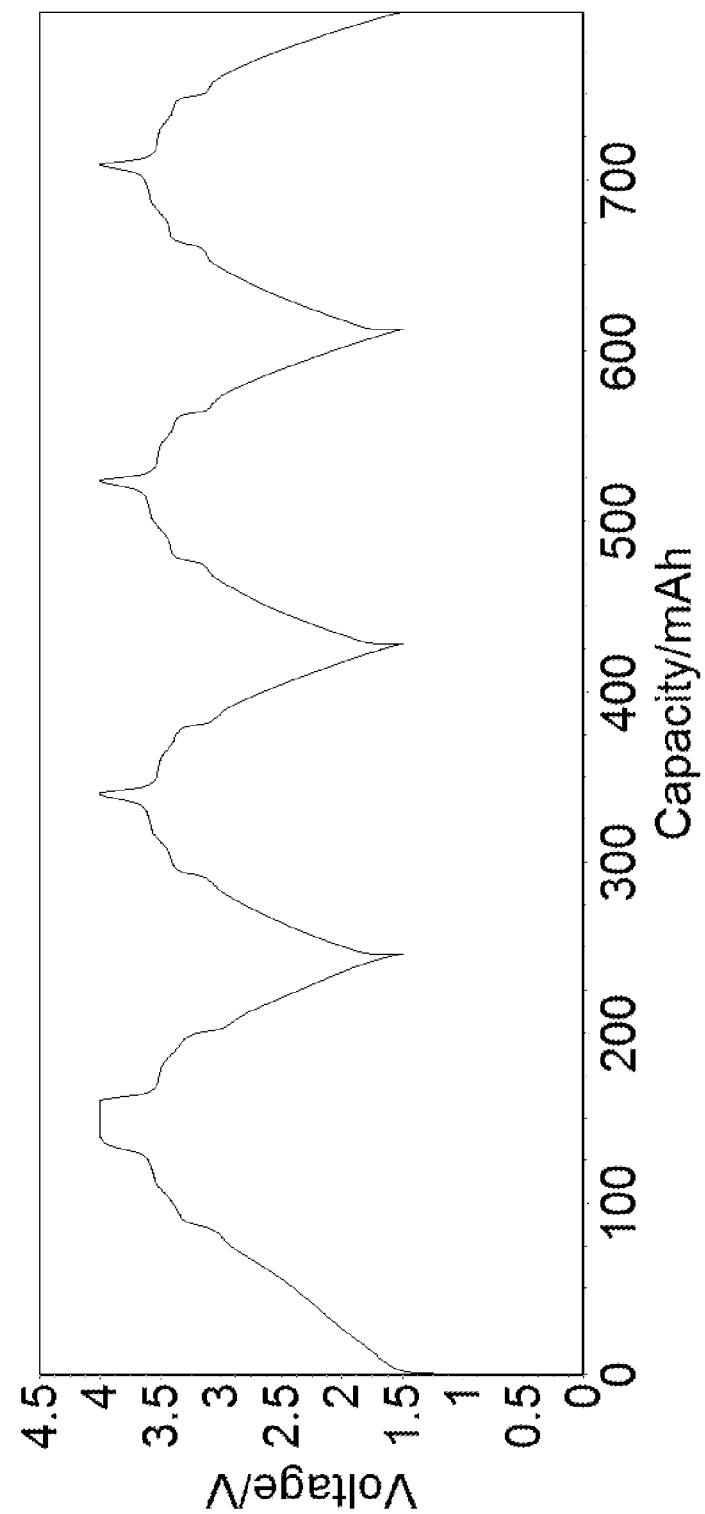
FIG. 1(B) shows the Charge-Discharge Voltage Profile for the first 4 cycles (Na-ion Cell Voltage [V] versus Cumulative Cathode Specific Capacity [mAh/g]) for a Hard Carbon//NaNi$_{0.5}$Mn$_{0.5}$O$_2$ cell, cycled between 1.5 to 4.0V at 30° C.

FIG. 1(B) shows the first 4 charge-discharge cycles (Na-ion Cell Voltage [V] versus Cumulative Cathode Specific Capacity [mAh/g]) for the Hard Carbon//$NaNi_{0.5}Mn_{0.5}O_2$ cell (Cell #204056). During the first charge process a cathode specific capacity of 162 mAh/g is achieved for the $NaNi_{0.5}Mn_{0.5}O_2$ active material. At cell voltages lower than about 3.7 V, a sloping profile is evident reflecting the Na extraction process proceeding based on the $Ni^{2+}$ to $Ni^{4+}$ redox couple from the $NaNi_{0.5}Mn_{0.5}O_2$ compound. The first discharge process is equivalent to a cathode specific capacity of 86 mAh/g. This discharge process is based on the $Ni^{4+}$ to $Ni^{2+}$ reduction process within the cathode material.

Figure 1C:
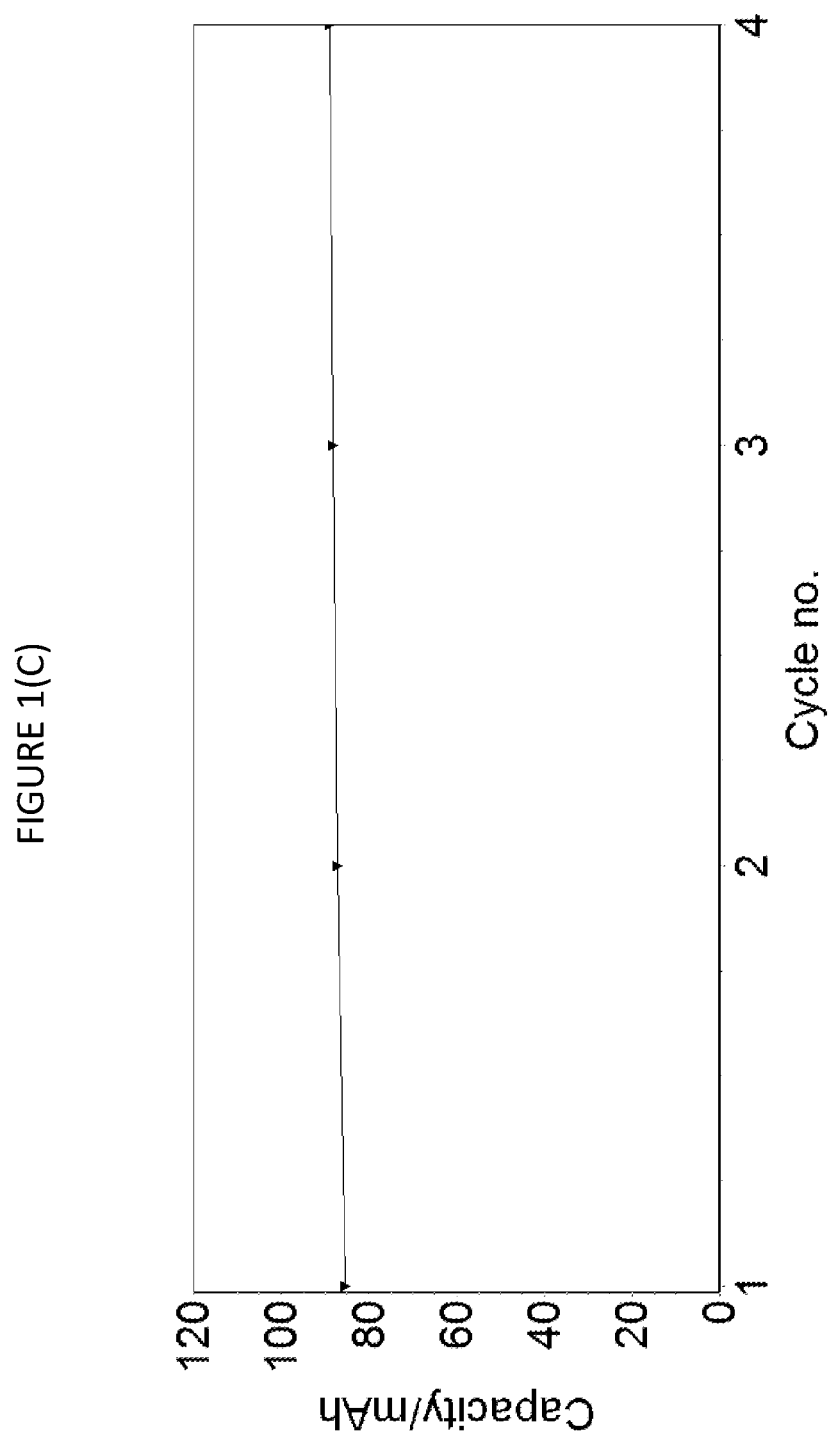
FIG. 1(C) shows the Cycle Life Performance (Cathode Specific Capacity [mAh/g] versus Cycle Number) for a Hard Carbon//NaNi$_{0.5}$Mn$_{0.5}$O$_2$ cell, cycled between 1.5 to 4.0V at 30° C.

FIG. 1(C) shows the cycle life performance (Cathode Specific Capacity [mAh/g] versus Cycle Number) for the Hard Carbon//$NaNi_{0.5}Mn_{0.5}O_2$ cell (Cell #204056). The cell shows good reversibility with the delivered cathode specific capacity being around 85 mAh/g after 4 cycles.

Figure 1D:
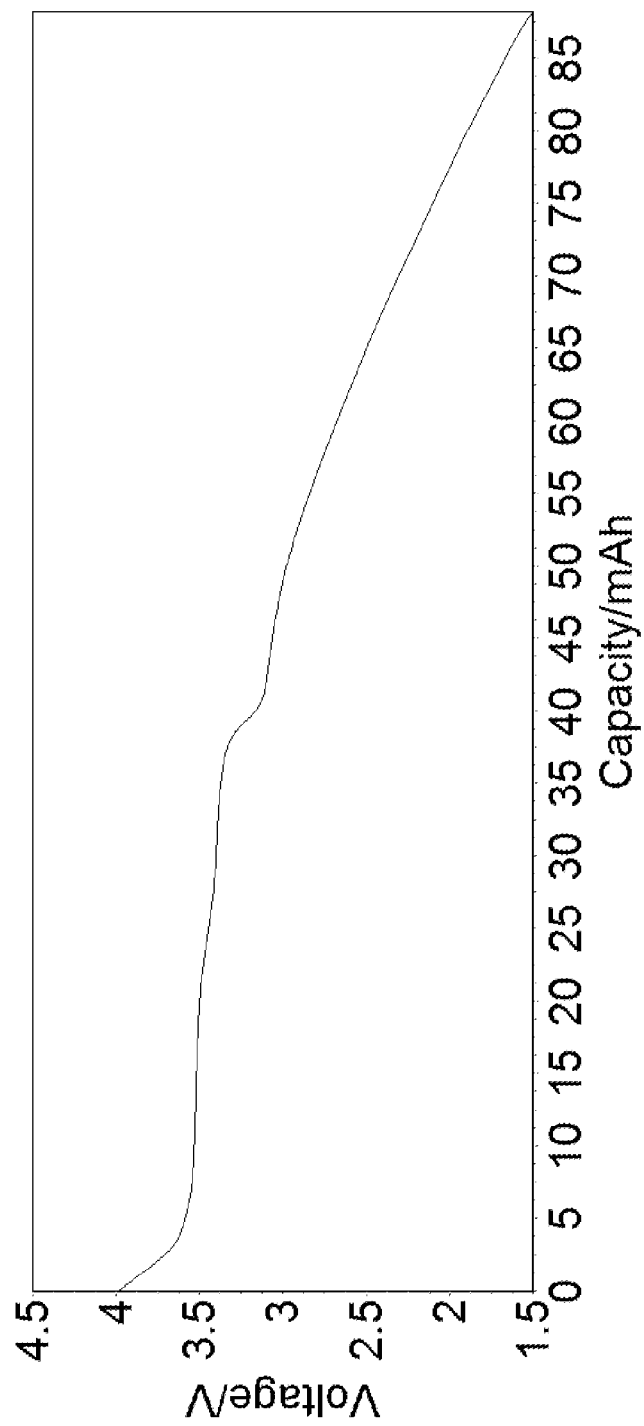
FIG. 1(D) shows the Third Cycle Discharge Voltage Profile (Na-ion Cell Voltage [V] versus Cathode Specific Capacity [mAh/g]) for a Hard Carbon//NaNi$_{0.5}$Mn$_{0.5}$O$_2$ cell, cycled between 1.5 to 4.0V at 30° C.

FIG. 1(D) shows the third cycle discharge voltage profile (Na-ion Cell Voltage [V] versus Cathode Specific Capacity [mAh/g]) for the Hard Carbon//$NaNi_{0.5}Mn_{0.5}O_2$ cell (Cell #204056). The cathode specific capacity in this cycle corresponds to 86 mAh/g.

Figure 1E:
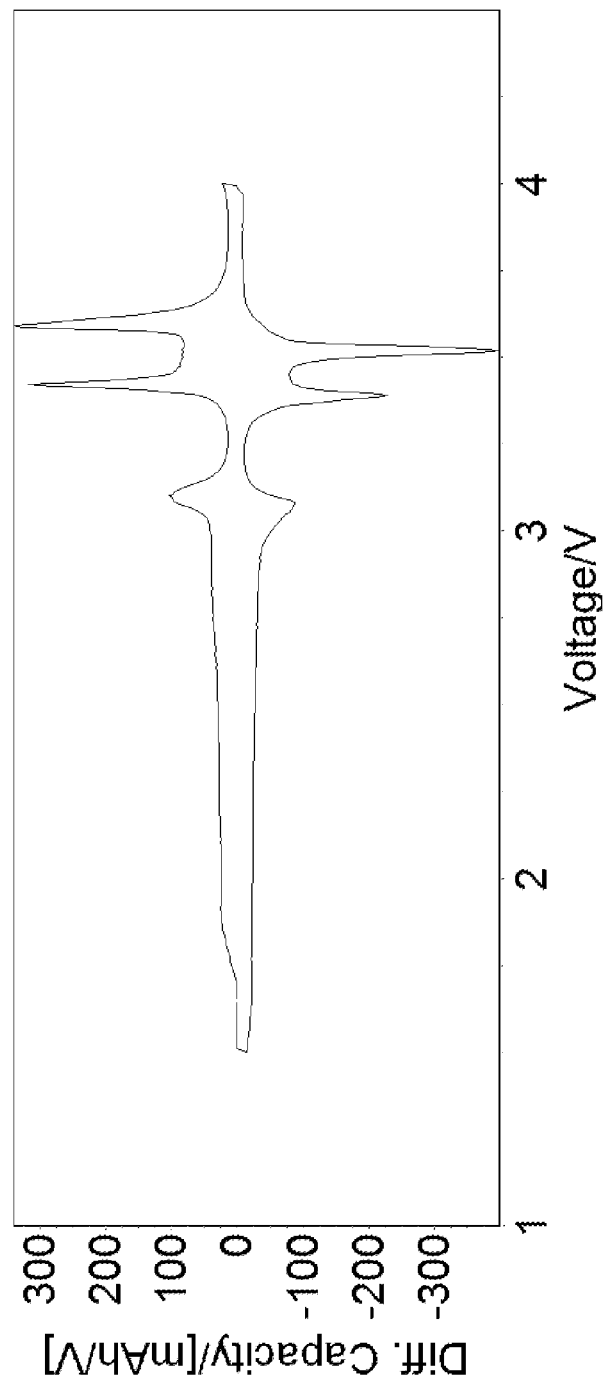
FIG. 1(E) shows the Third Cycle Differential Capacity Profiles (Differential Capacity [mAh/g/V]) versus Na-ion Cell voltage [V]) for a Hard Carbon//NaNi$_{0.5}$Mn$_{0.5}$O$_2$ cell, cycled between 1.5 to 4.0V at 30° C.

FIG. 1(E) shows the third cycle differential capacity profiles (Differential Capacity [mAh/g/V] versus Na-ion Cell Voltage [V]) for the Hard Carbon//$NaNi_{0.5}Mn_{0.5}O_2$ cell (Cell #204056). These symmetrical data demonstrate the reversibility of the ion-insertion reactions in this Na-ion cell.

In conclusion, this comparative Example shows that $NaNi_{0.5}Mn_{0.5}O_2$, although containing more Ni than any of the experimental examples, delivers far lower reversible specific capacity. The Na:Ni ratio (2:1) is set at a level where all of the redox processes that are occurring during cell charge and discharge are solely based on the $Ni^{2+}$ to $Ni^{4+}$ redox couple in the cathode active material. There is no anomalous capacity behaviour, and this limits the cathode reversible capacity.

Example 2

The Effect of Charging $Na_{0.95}Ni_{0.3167}Mn_{0.3167}Mg_{0.1583}Ti_{0.2083}O_2$ Beyond the Conventional Theoretical Capacity as Determined by the $Ni^{2+}$ to $Ni^{4+}$ Redox Couple, in Accordance with the Process of the Present Invention A Hard Carbon//$Na_{0.95}Ni_{0.3167}Mn_{0.3167}Mg_{0.1583}Ti_{0.2083}O_2$ cell was prepared as described below and then overcharged and held at 4.2V in accordance with the process of the present invention.

The data shown in FIGS. 2(B) to 2(E) are derived from the constant current cycling data for a $Na_{0.95}Ni_{0.3167}Mn_{0.3167}Mg_{0.1583}Ti_{0.2083}O_2$ compound in a Na-ion cell (Cell #311033) where this cathode material was coupled with a capacity balanced Hard Carbon (Carbotron P/J) anode material. The electrolyte used was a 0.5 M solution of $NaClO_4$ in propylene carbonate. The constant current data were collected at an approximate current density of 0.125 mA/cm$^2$ between voltage limits of 1.00 and 4.20 V. To fully charge the cell the Na-ion cell was potentiostatically held at 4.2 V at the end of the constant current charging process until the current dropped to less than 1% of the constant current value. The cell testing was carried out at 30° C. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 2A:
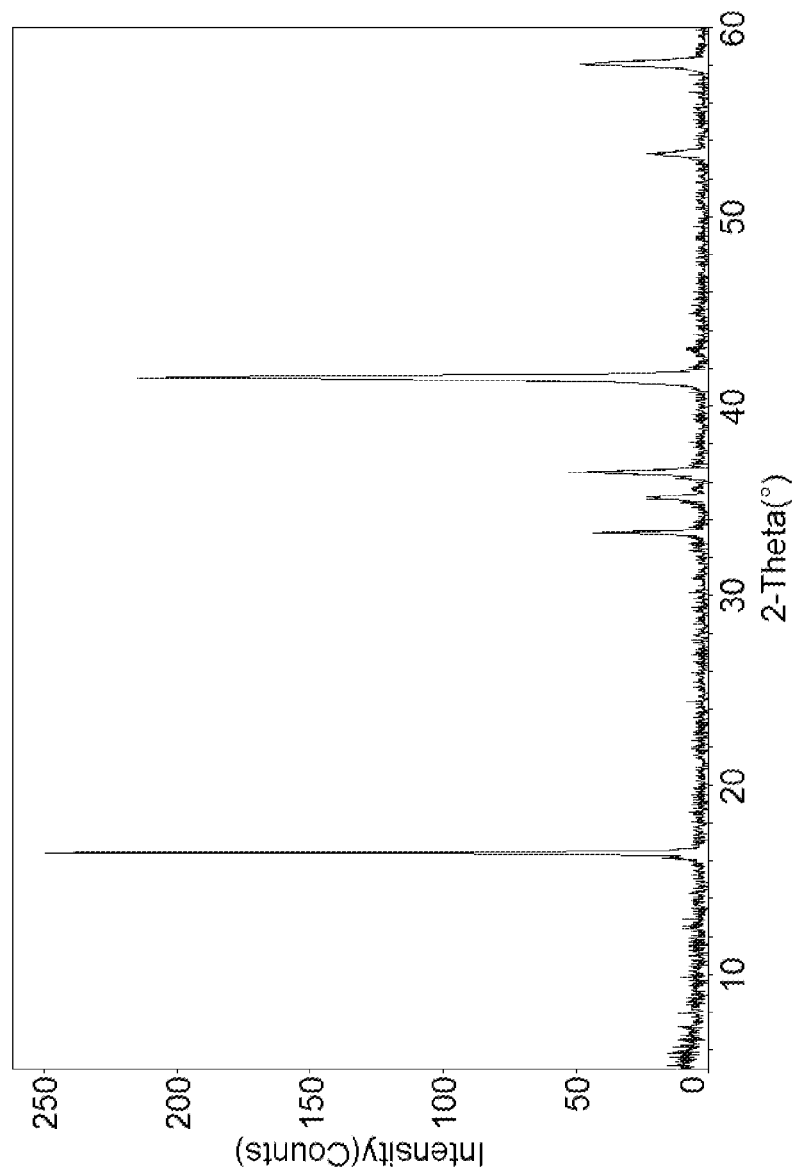
FIG. 2(A) is the XRD profile for the compound Na$_{0.95}$Ni$_{0.3167}$Mn$_{0.3167}$Mg$_{0.1583}$Ti$_{0.2083}$O$_2$ used in Example 2.
Figure 2B:
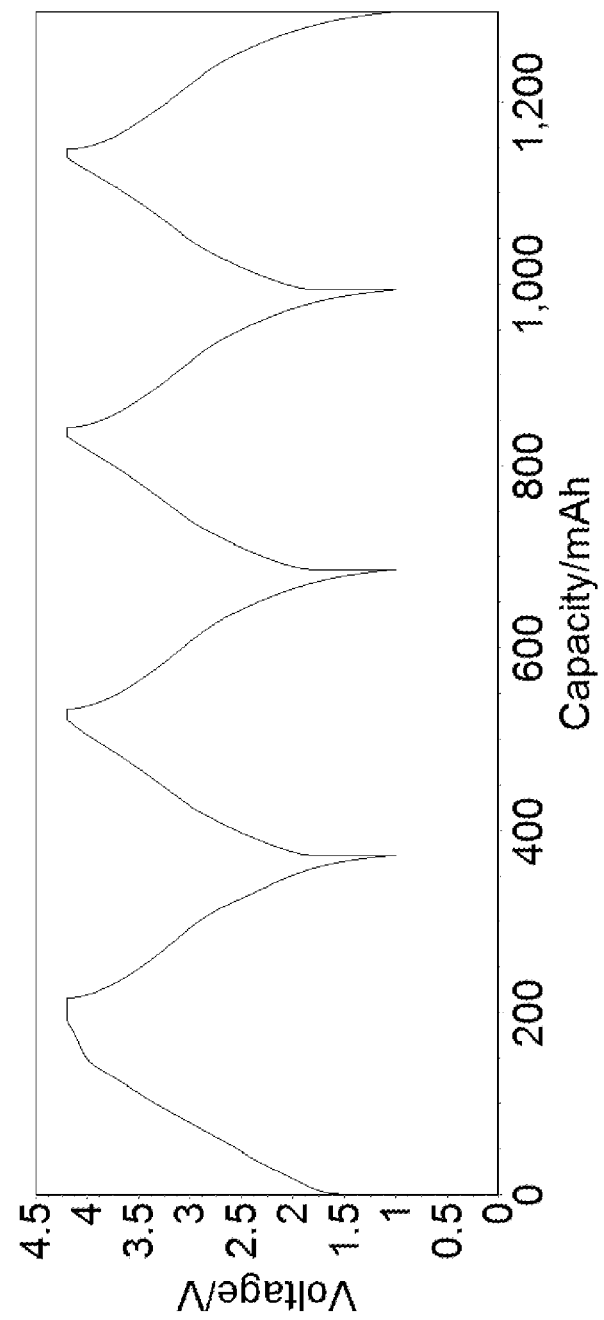
FIG. 2(B) shows the Charge-Discharge Voltage Profiles for the first 4 cycles (Na-ion cell Voltage [V] versus Cumulative Cathode Specific Capacity [mAh/g]) for a Hard Carbon//Na$_{0.95}$Ni$_{0.3167}$Mn$_{0.3167}$Mg$_{0.1583}$Ti$_{0.2083}$O$_2$ cell, cycled between 1.0 to 4.2V at 30° C.

FIG. 2(B) shows the first 4 charge-discharge cycles (Na-ion Cell Voltage [V] versus Cumulative Cathode Specific Capacity [mAh/g]) for the Hard Carbon//$Na_{0.95}Ni_{0.3167}Mn_{0.3167}Mg_{0.1583}Ti_{0.2083}O_2$ cell (Cell #311033). During the first charge process an anomalously high charge capacity is realized—a cathode specific capacity of 214 mAh/g is achieved—a figure which is significantly larger than the theoretical specific capacity (based on the $Ni^{2+}$ to $Ni^{4+}$ redox couple) for the $Na_{0.95}Ni_{0.0.3167}Mn_{0.3167}Mg_{0.1583}Ti_{0.2083}O_2$ compound. In particular, a two section voltage profile is clearly evident during this initial cell charge step. At cell voltages lower than about 4.0 V a sloping profile is evident reflecting the conventional Na extraction process based on the $Ni^{2+}$ to $Ni^{4+}$ redox couple from the $Na_{0.95}Ni_{0.3167}Mn_{0.3167}Mg_{0.1583}Ti_{0.2083}O_2$ compound. At cell voltages greater than about 4.0 V, a more flat voltage region is evident which presumably reflects a new Na extraction process (i.e. not based on the $Ni^{2+}$ to $Ni^{4+}$ redox couple) occurring for the $Na_{0.95}Ni_{0.3167}Mn_{0.3167}Mg_{0.1583}Ti_{0.2083}O_2$ compound. Importantly, this two section charge behaviour is not evident on subsequent cell charge profiles. The first discharge process is equivalent to a cathode specific capacity of 158 mAh/g.

Figure 2C:
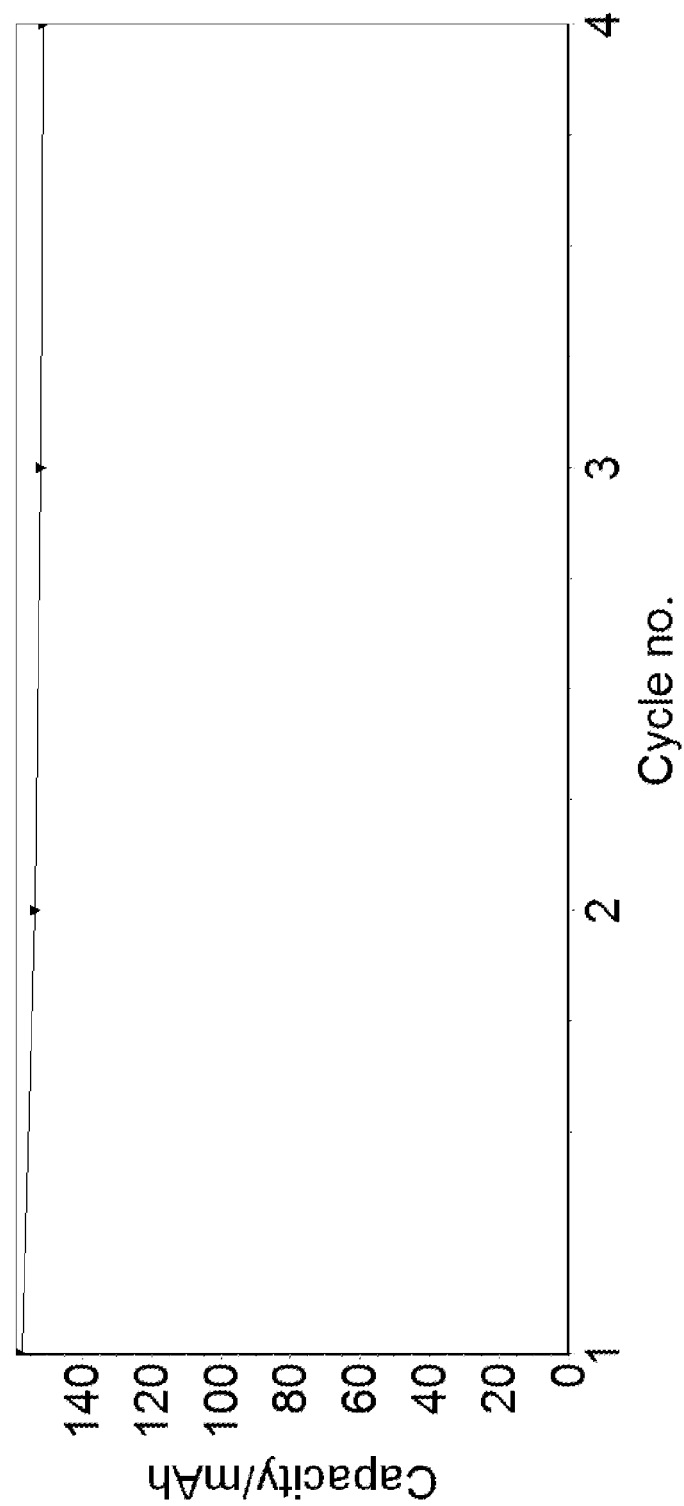
FIG. 2(C) shows the Cycle Life Performance (Cathode Specific Capacity [mAh/g] versus Cycle Number) for a Hard Carbon//Na$_{0.95}$Ni$_{0.0.3167}$Mn$_{0.3167}$Mg$_{0.1583}$Ti$_{0.2083}$O$_2$ cell, cycled between 1.0 to 4.2V at 30° C.

FIG. 2(C) shows the cycle life performance (Cathode Specific Capacity [mAh/g] versus Cycle Number) for the Hard Carbon//$Na_{0.95}Ni_{0.0.3167}Mn_{0.3167}Mg_{0.1583}Ti_{0.2083}O_2$ cell (Cell #311033). The cell shows good reversibility with the delivered cathode specific capacity being around 150 mAh/g after 4 cycles.

Figure 2D:
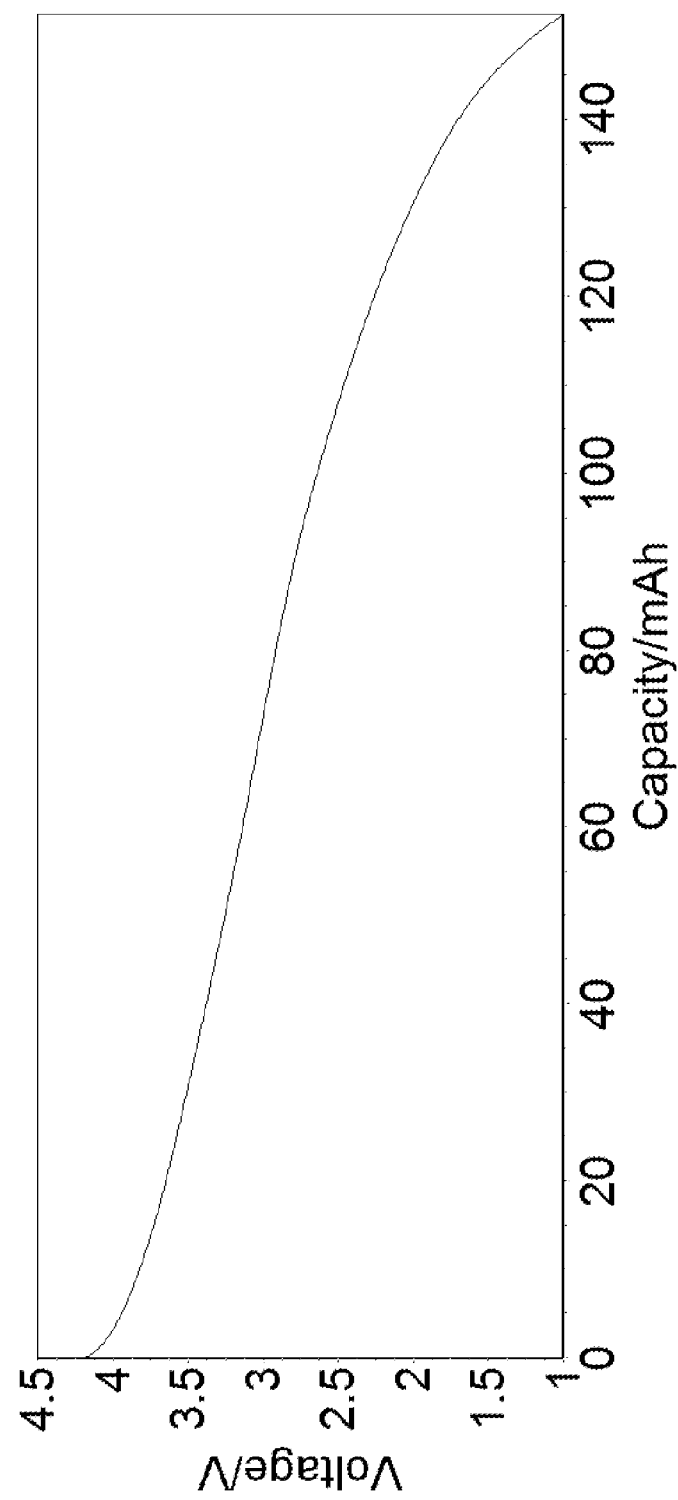
FIG. 2(D) shows the Third Cycle Discharge Voltage Profile (Na-ion Cell Voltage [V] versus Cathode Specific Capacity [mAh/g]) for a Hard Carbon//Na$_{0.95}$Ni$_{0.3167}$Mn$_{0.3167}$Mg$_{0.1583}$Ti$_{0.2083}$O$_2$ cell, cycled between 1.0 to 4.2V at 30° C.

FIG. 2(D) shows the third cycle discharge voltage profile (Na-ion Cell Voltage [V] versus Cathode Specific Capacity [mAh/g]) for the Hard Carbon//$Na_{0.95}Ni_{0.3167}Mn_{0.3167}Mg_{0.1583}Ti_{0.2083}O_2$ cell (Cell #311033). The cathode specific capacity in this cycle corresponds to 152 mAh/g.

Figure 2E:
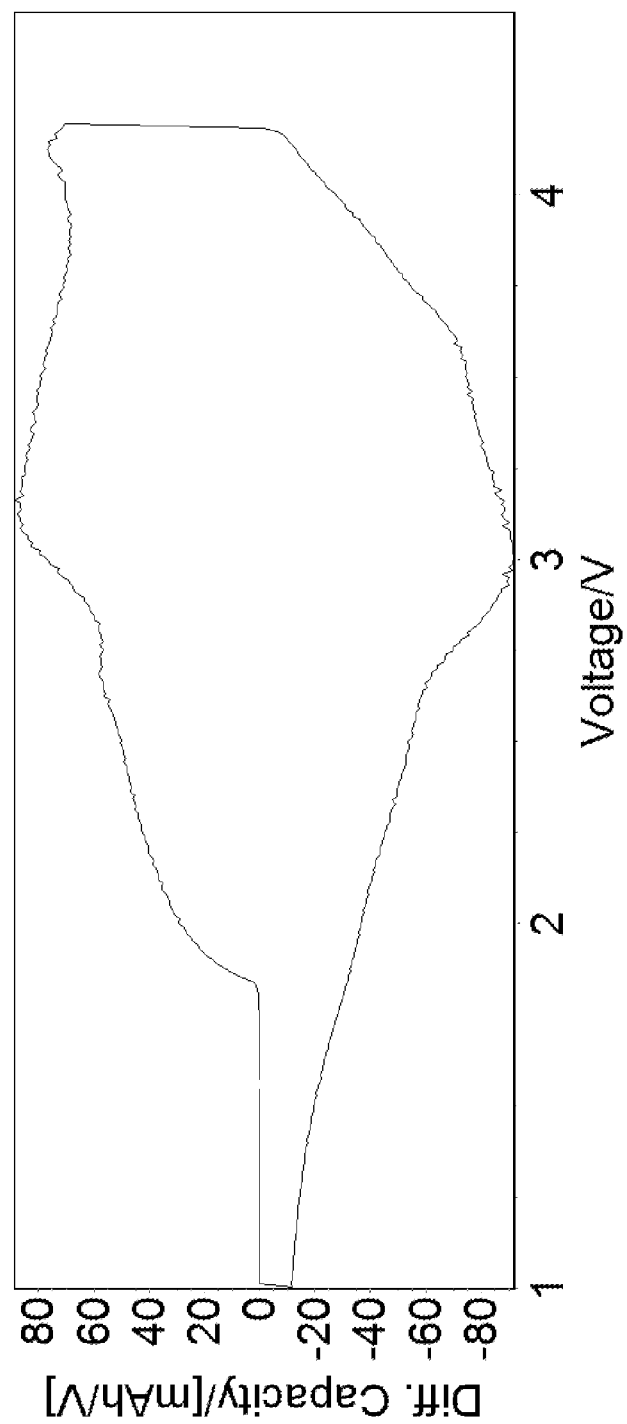
FIG. 2(E) shows the Third Cycle Differential Capacity Profiles (Differential Capacity [mAh/g/V]) versus Na-ion Cell voltage [V]) for a Hard Carbon//Na$_{0.95}$Ni$_{0.3167}$Mn$_{0.3167}$Mg$_{0.1583}$Ti$_{0.2083}$O$_2$ cell, cycled between 1.0 to 4.2V at 30° C.

FIG. 2(E) shows the third cycle differential capacity profiles (Differential Capacity [mAh/g/V] versus Na-ion Cell Voltage [V]) for the Hard Carbon//$Na_{0.95}Ni_{0.3167}Mn_{0.3167}Mg_{0.1583}Ti_{0.2083}O_2$ cell (Cell #311033). These symmetrical data demonstrate the excellent reversibility of the ion-insertion reactions in this Na-ion cell.

In conclusion, the electrochemical data obtained in Example 2 demonstrate high active material specific capacity and excellent reversibility. The data are far superior to those shown in the comparative Example 1, in which both the Ni- and Na-contents are higher.

Example 3

The Effect of Charging $Na_{0.925}Ni_{0.308}Mn_{0.308}Mg_{0.154}Ti_{0.229}O_2$ Beyond the Conventional Theoretical Capacity as Determined by the $Ni^{2+}$ to $Ni^{4+}$ Redox Couple, in Accordance with the Process of the Present Invention A Hard Carbon//$Na_{0.925}Ni_{0.308}Mn_{0.308}Mg_{0.154}Ti_{0.229}O_2$ cell was prepared as described below and then overcharged and held at 4.2V in accordance with the process of the present invention.

The data shown in FIGS. 3(B) to 3(E) are derived from the constant current cycling data for a $Na_{0.925}Ni_{0.308}Mn_{0.308}Mg_{0.154}Ti_{0.229}O_2$ compound in a Na-ion cell (Cell #312001) where this cathode material was coupled with a capacity balanced Hard Carbon (Carbotron P/J) anode material. The electrolyte used was a 0.5 M solution of $NaClO_4$ in propylene carbonate. The constant current data were collected at an approximate current density of 0.125 $mA/cm^2$ between voltage limits of 1.00 and 4.20 V. To fully charge the cell the Na-ion cell was potentiostatically held at 4.2 V at the end of the constant current charging process until the current dropped to less than 1% of the constant current value. The cell testing was carried out at 30° C. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 3A:
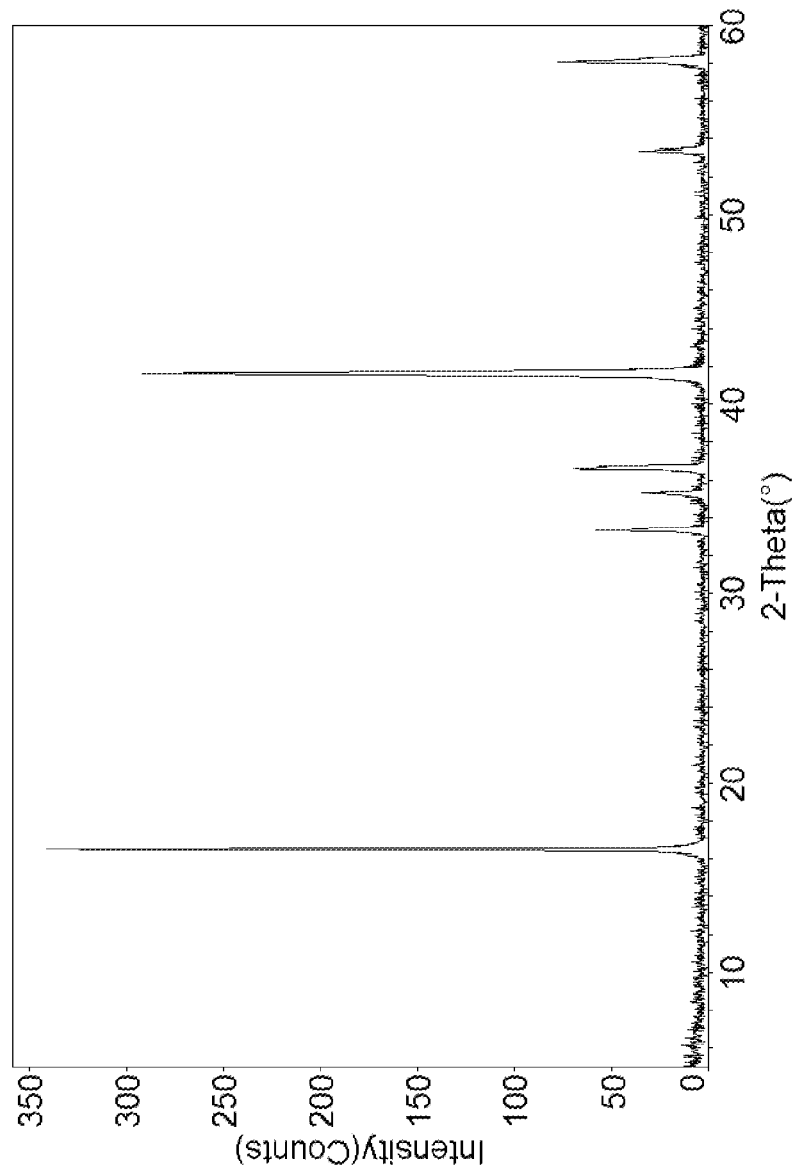
FIG. 3(A) is the XRD profile for the compound Na$_{0.925}$Ni$_{0.308}$Mn$_{0.308}$Mg$_{0.154}$Ti$_{0.229}$O$_2$ used in Example 3.
Figure 3B:
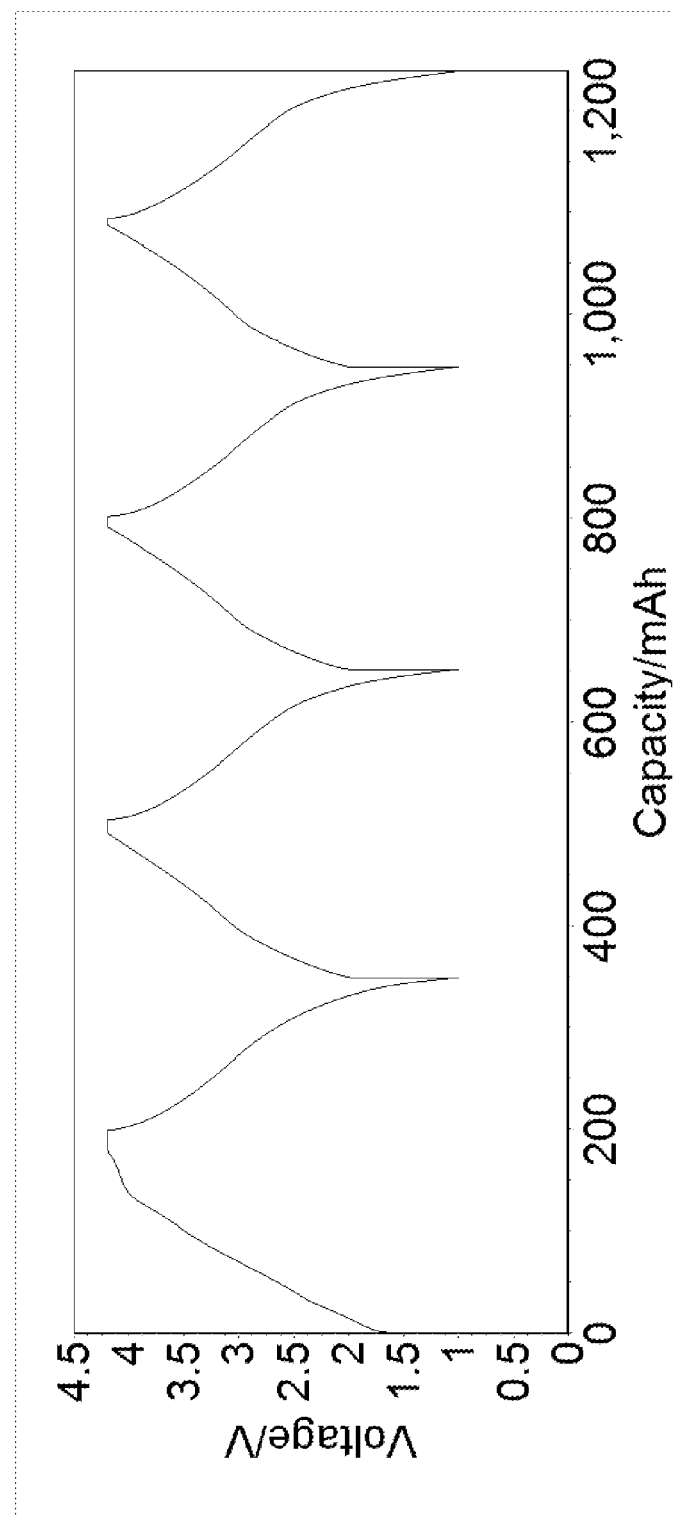
FIG. 3(B) shows the Charge-Discharge Voltage Profiles for the first 4 cycles (Na-ion cell Voltage [V] versus Cumulative Cathode Specific Capacity [mAh/g]) for a Hard Carbon//Na$_{0.925}$Ni$_{0.308}$Mn$_{0.308}$Mg$_{0.154}$Ti$_{0.229}$O$_2$ cell, cycled between 1.0 to 4.2V at 30° C.

FIG. 3(B) shows the first 4 charge-discharge cycles (Na-ion Cell Voltage [V] versus Cumulative Cathode Specific Capacity [mAh/g]) for the Hard Carbon//$Na_{0.925}Ni_{0.308}Mn_{0.308}Mg_{0.154}Ti_{0.229}O_2$ cell (Cell #312001). During the first charge process above approximately 4 V an anomalously high charge capacity is realized—a cathode specific capacity of 199 mAh/g is achieved a figure which is significantly larger than the theoretical specific capacity (based on the $Ni^{2+}$ to $Ni^{4+}$ redox couple) for the $Na_{0.925}Ni_{0.308}Mn_{0.308}Mg_{0.154}Ti_{0.229}O_2$ active material. In particular, a two section voltage profile is clearly evident during this initial cell charge step. At cell voltages lower than about 4.0 V a sloping profile is evident reflecting the conventional Na extraction process based on the $Ni^{2+}$ to $Ni^{4+}$ redox couple from the $Na_{0.925}Ni_{0.308}Mn_{0.308}Mg_{0.154}Ti_{0.229}O_2$ active material. At cell voltages greater than about 4.0 V, a more flat voltage region is evident which presumably reflects a new Na extraction process (i.e. not based on the $Ni^{2+}$ to $Ni^{4+}$ redox couple) occurring for the $Na_{0.925}Ni_{0.308}Mn_{0.308}Mg_{0.154}Ti_{0.229}O_2$ active material. Importantly, this two section charge behaviour is not evident on subsequent cell charge profiles. The first discharge process is equivalent to a cathode specific capacity of 150 mAh/g.

Figure 3C:
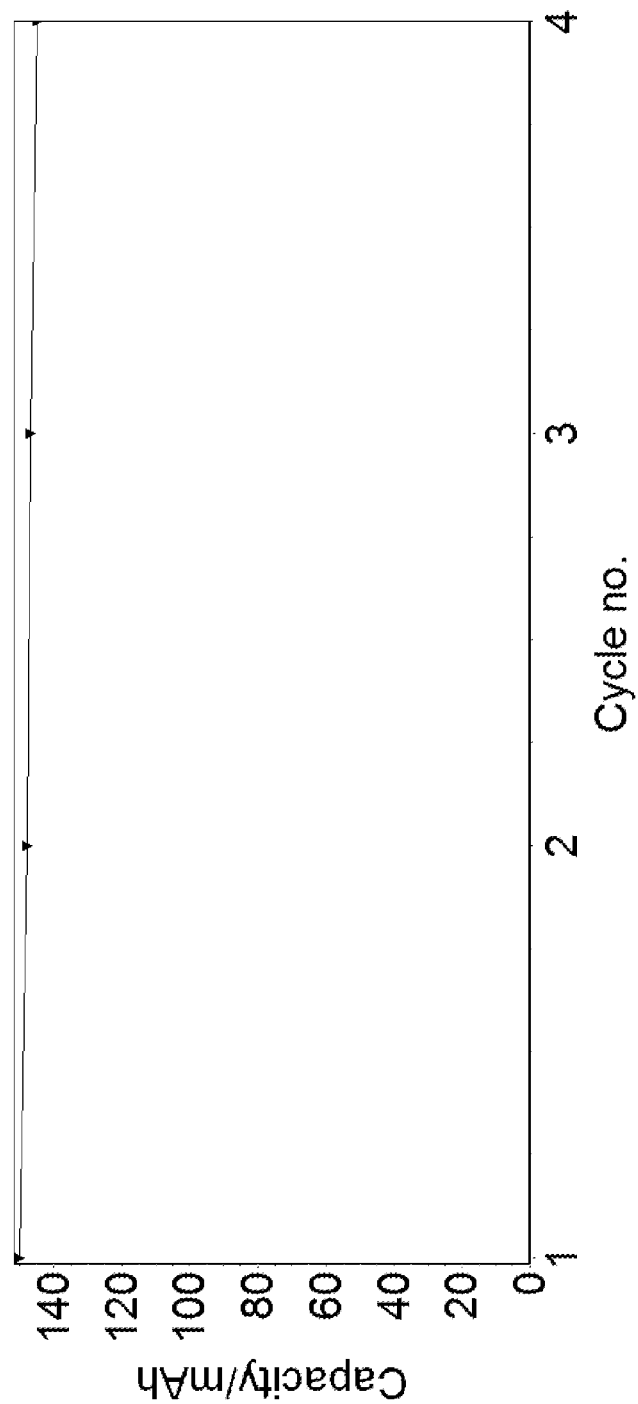
FIG. 3(C) shows the Cycle Life Performance (Cathode Specific Capacity [mAh/g] versus Cycle Number) for a Hard Carbon//Na$_{0.925}$Ni$_{0.308}$Mn$_{0.308}$Mg$_{0.154}$Ti$_{0.229}$O$_2$ cell, cycled between 1.0 to 4.2V at 30° C.

FIG. 3(C) shows the cycle life performance (Cathode Specific Capacity [mAh/g] versus Cycle Number) for the Hard Carbon//$Na_{0.925}Ni_{0.308}$ $Mn_{0.308}$ $Mg_{0.154}Ti_{0.229}O_2$ cell (Cell #312001). The cell shows good reversibility with the delivered cathode specific capacity being around 145 mAh/g after 4 cycles.

Figure 3D:
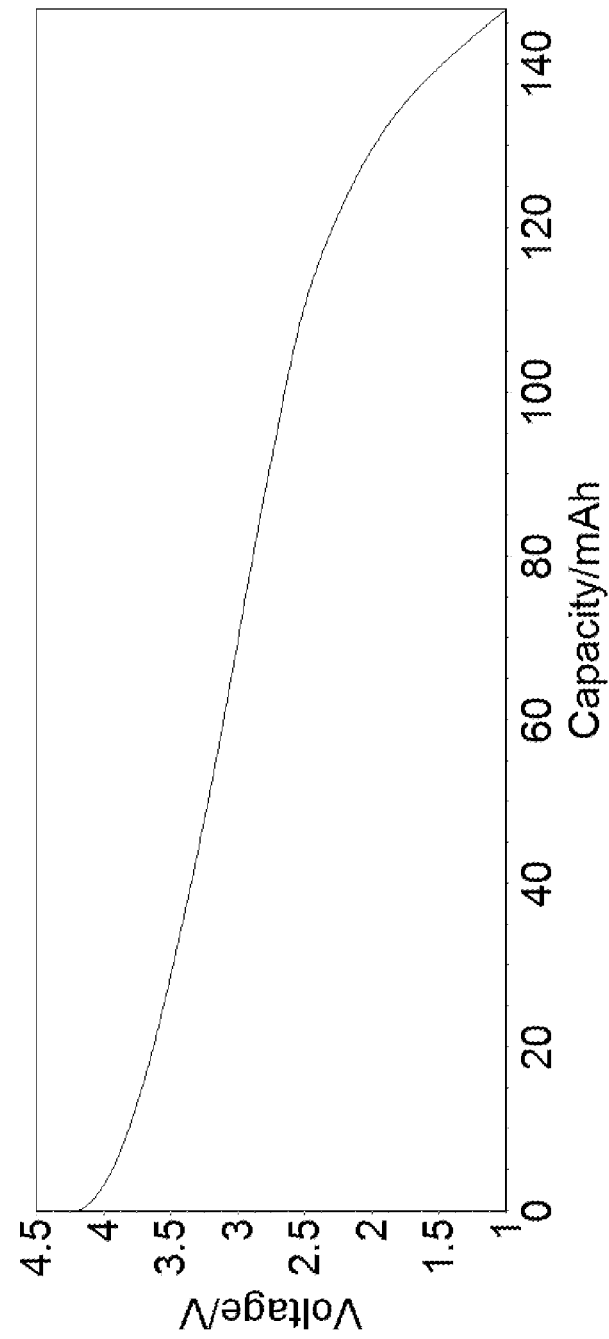
FIG. 3(D) shows the Third Cycle Discharge Voltage Profile (Na-ion Cell Voltage [V] versus Cathode Specific Capacity [mAh/g]) for a Hard Carbon//Na$_{0.925}$Ni$_{0.308}$Mn$_{0.308}$Mg$_{0.154}$Ti$_{0.229}$O$_2$ cell, cycled between 1.0 to 4.2V at 30° C.

FIG. 3(D) shows the third cycle discharge voltage profile (Na-ion Cell Voltage [V] versus Cathode Specific Capacity [mAh/g]) for the Hard Carbon//$Na_{0.925}Ni_{0.308}$ $Mn_{0.308}$ $Mg_{0.154}Ti_{0.229}O_2$ cell (Cell #312001). The cathode specific capacity in this cycle corresponds to 147 mAh/g.

Figure 3E:
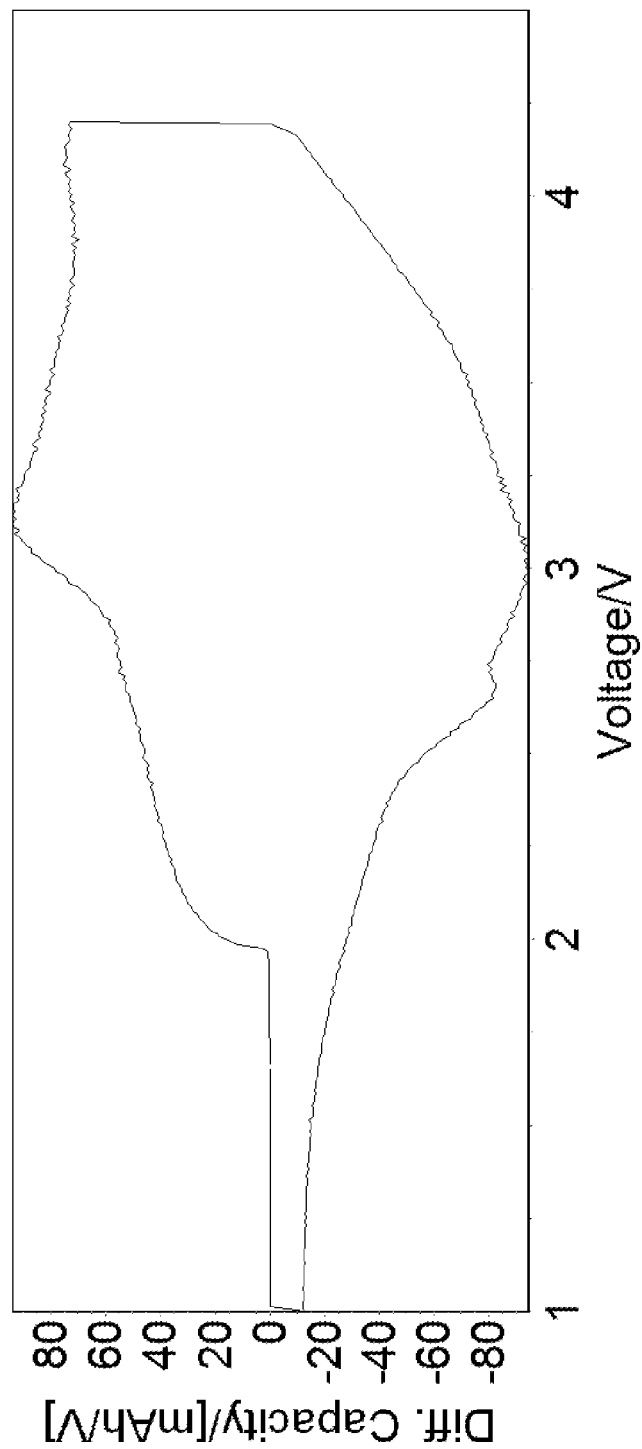
FIG. 3(E) shows the Third Cycle Differential Capacity Profiles (Differential Capacity [mAh/g/V]) versus Na-ion Cell voltage [V]) for a Hard Carbon//Na$_{0.925}$Ni$_{0.308}$Mn$_{0.308}$Mg$_{0.154}$Ti$_{0.229}$O$_2$ cell, cycled between 1.0 to 4.2V at 30° C.

FIG. 3(E) shows the third cycle differential capacity profiles (Differential Capacity [mAh/g/V] versus Na-ion Cell Voltage [V]) for the Hard Carbon//$Na_{0.925}Ni_{0.308}$ $Mn_{0.308}Mg_{0.154}Ti_{0.229}O_2$ cell (Cell #312001). These symmetrical data demonstrate the excellent reversibility of the ion-insertion reactions in this Na-ion cell.

In conclusion, the electrochemical data obtained in Example 3 demonstrate high active material specific capacity and excellent reversibility. The data are far superior to those shown in the comparative Example 1, in which both the Ni- and Na-contents are higher.

Example 4

The Effect of Charging $Na_{0.9}Ni_{0.3}Mn_{0.3}Mg_{0.15}Ti_{0.25}O_2$ Beyond the Conventional Theoretical Capacity as Determined by the $Ni^{2+}$ to $Ni^{4+}$ Redox Couple, in Accordance with the Process of the Present Invention A Hard Carbon//$Na_{0.9}Ni_{0.3}Mn_{0.3}Mg_{0.15}Ti_{0.25}O_2$ cell was prepared as described below and then overcharged and held at 4.2V in accordance with the process of the present invention.

The data shown in FIGS. 4(B) to 4(E) are derived from the constant current cycling data for a $Na_{0.9}Ni_{0.3}Mn_{0.3}Mg_{0.15}Ti_{0.25}O_2$ active material in a Na-ion cell (Cell #311069) where this cathode material was coupled with a capacity balanced Hard Carbon (Carbotron P/J) anode material. The electrolyte used was a 0.5 M solution of $NaClO_4$ in propylene carbonate. The constant current data were collected at an approximate current density of 0.125 mA/cm$^2$ between voltage limits of 1.00 and 4.20 V. To fully charge the cell the Na-ion cell was potentiostatically held at 4.2 V at the end of the constant current charging process until the current dropped to less than 1% of the constant current value. The cell testing was carried out at 30° C. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 4A:
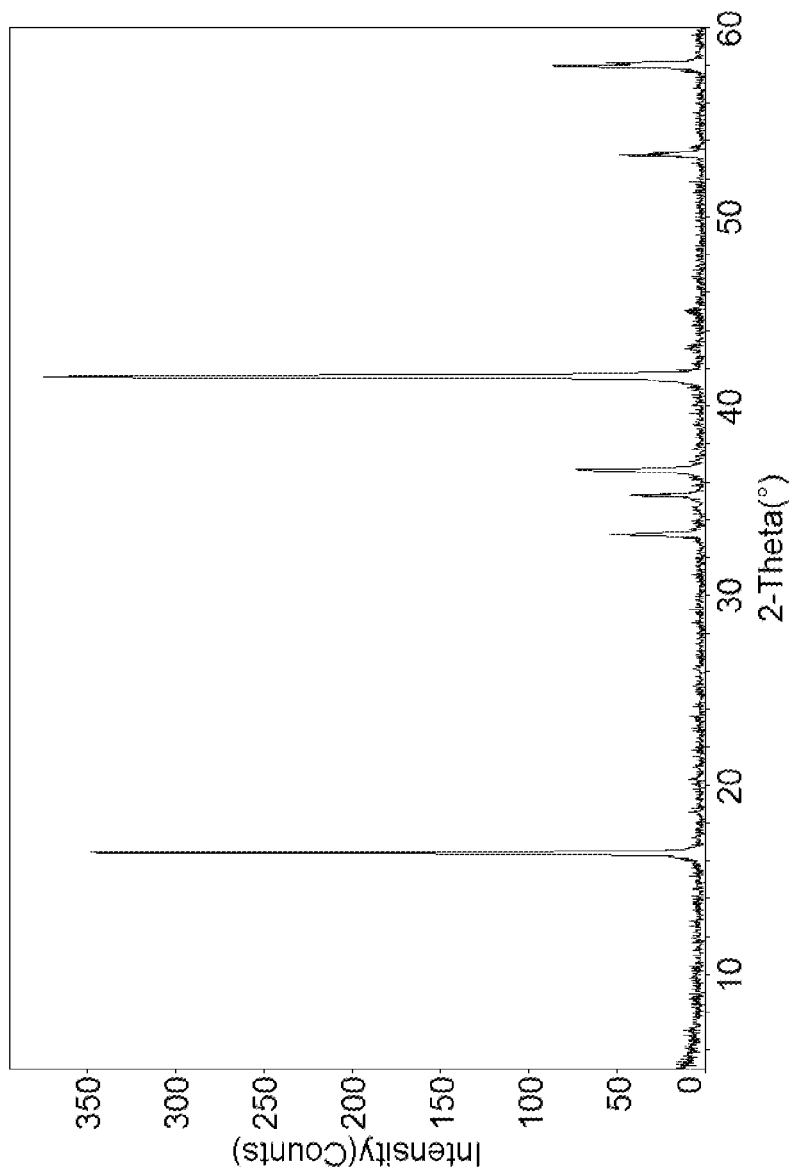
FIG. 4(A) is the XRD profile for the compound Na$_{0.9}$Ni$_{0.3}$Mn$_{0.3}$Mg$_{0.15}$Ti$_{0.25}$O$_2$ used in Example 4.
Figure 4B:
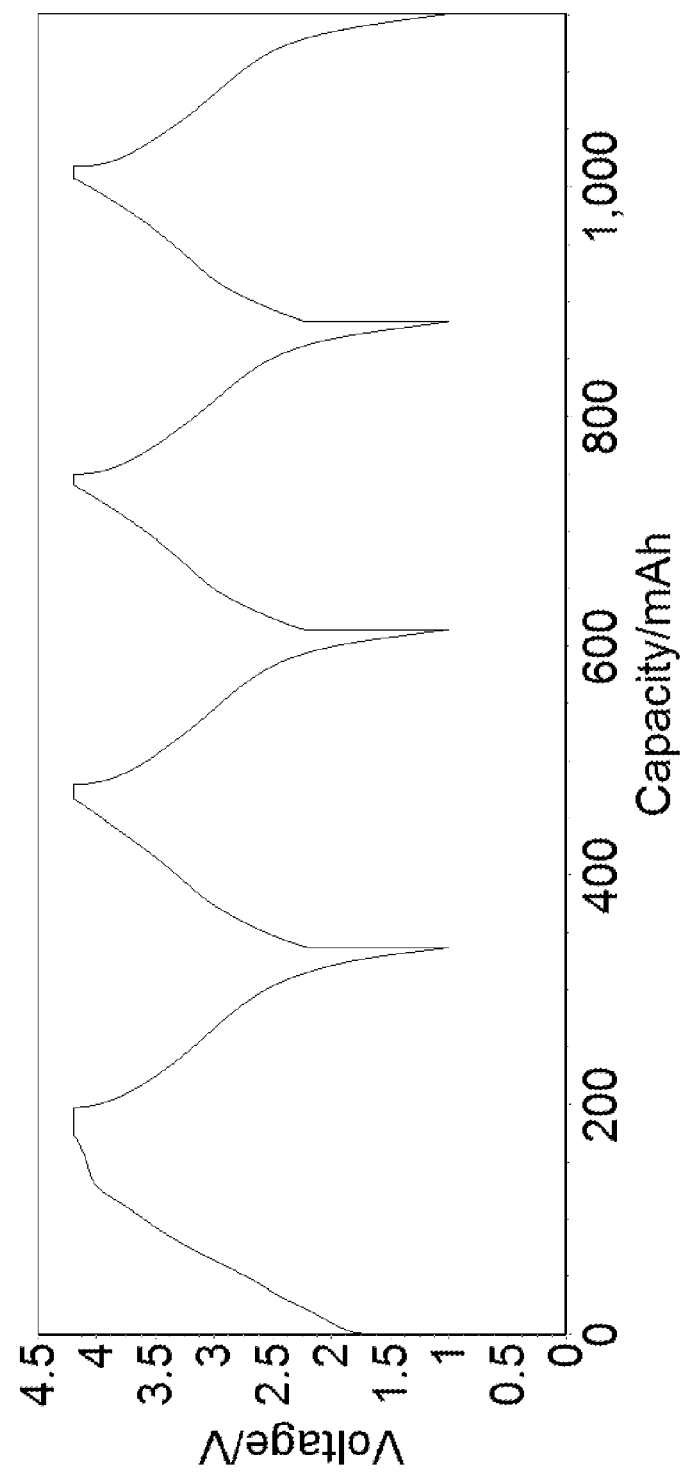
FIG. 4(B) shows the Charge-Discharge Voltage Profiles for the first 4 cycles (Na-ion cell Voltage [V] versus Cumulative Cathode Specific Capacity [mAh/g]) for a Hard Carbon//Na$_{0.9}$Ni$_{0.3}$Mn$_{0.3}$Mg$_{0.15}$Ti$_{0.25}$O$_2$ cell, cycled between 1.0 to 4.2V at 30° C.

FIG. 4(B) shows the first 4 charge-discharge cycles (Na-ion Cell Voltage [V] versus Cumulative Cathode Specific Capacity [mAh/g]) for the Hard Carbon//$Na_{0.9}Ni_{0.3}Mn_{0.3}Mg_{0.15}Ti_{0.25}O_2$ cell (Cell #311069). During the first charge process an anomalously high charge capacity is realized—a cathode specific capacity of 197 mAh/g is achieved a figure which is significantly larger than the theoretical specific capacity (based on the $Ni^{2+}$ to $Ni^{4+}$ redox couple) for the $Na_{0.925}Ni_{0.0.308}Mn_{0.308}Mg_{0.154}Ti_{0.229}O_2$ active material. In particular, a two section voltage profile is clearly evident during this initial cell charge step. At cell voltages lower than about 4.0 V a sloping profile is evident reflecting the conventional Na extraction process based on the $Ni^{2+}$ to $Ni^{4+}$ redox couple from the $Na_{0.9}Ni_{0.3}Mn_{0.3}Mg_{0.15}Ti_{0.25}O_2$ active material. At cell voltages greater than about 4.0 V, a more flat voltage region is evident which presumably reflects a new Na extraction process (i.e. not based on the $Ni^{2+}$ to $Ni^{4+}$ redox couple) occurring for the $Na_{0.9}Ni_{0.3}Mn_{0.3}Mg_{0.15}Ti_{0.25}O_2$ active material. Importantly, this two section charge behaviour is not evident on subsequent cell charge profiles. The first discharge process is equivalent to a cathode specific capacity of 140 mAh/g.

Figure 4C:
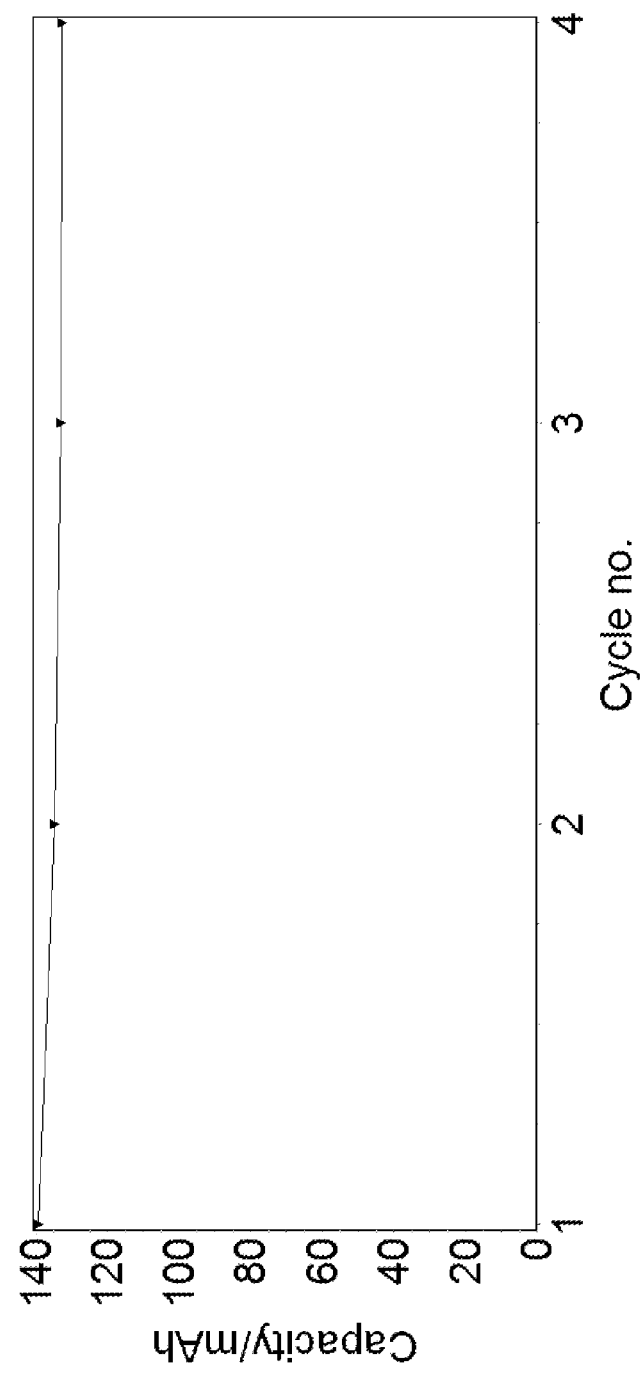
FIG. 4(C) shows the Cycle Life Performance (Cathode Specific Capacity [mAh/g] versus Cycle Number) for a Hard Carbon//Na$_{0.9}$Ni$_{0.3}$Mn$_{0.3}$Mg$_{0.15}$Ti$_{0.25}$O$_2$ cell, cycled between 1.0 to 4.2V at 30° C.

FIG. 4(C) shows the cycle life performance (Cathode Specific Capacity [mAh/g] versus Cycle Number) for the Hard Carbon//$Na_{0.9}Ni_{0.3}Mn_{0.3}Mg_{0.15}Ti_{0.25}O_2$ cell (Cell #311069). The cell shows good reversibility with the delivered cathode specific capacity being around 133 mAh/g after 4 cycles.

Figure 4D:
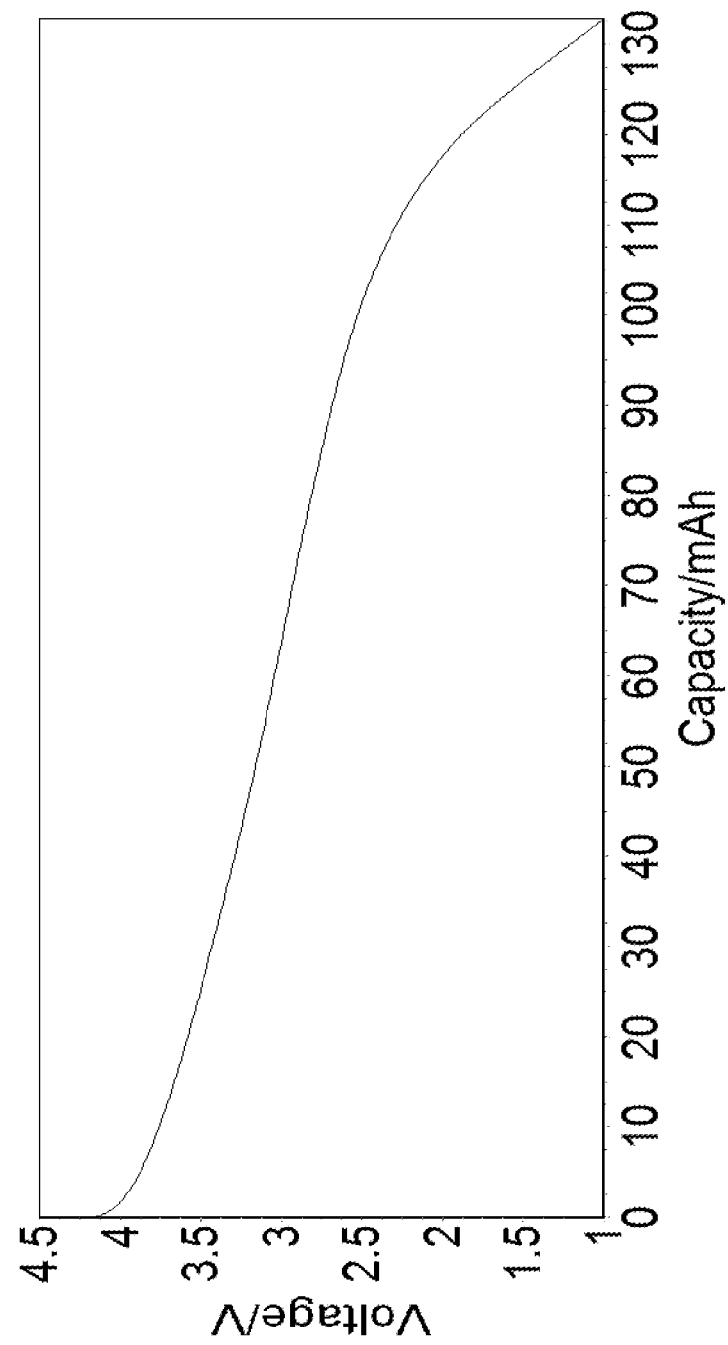
FIG. 4(D) shows the Third Cycle Discharge Voltage Profile (Na-ion Cell Voltage [V] versus Cathode Specific Capacity [mAh/g]) for a Hard Carbon//Na$_{0.9}$Ni$_{0.3}$Mn$_{0.3}$Mg$_{0.15}$Ti$_{0.25}$O$_2$ cell, cycled between 1.0 to 4.2V at 30° C.

FIG. 4(D) shows the third cycle discharge voltage profile (Na-ion Cell Voltage [V] versus Cathode Specific Capacity [mAh/g]) for the Hard Carbon//$Na_{0.9}Ni_{0.3}Mn_{0.3}Mg_{0.15}Ti_{0.25}O_2$ cell (Cell #311069). The cathode specific capacity in this cycle corresponds to 134 mAh/g.

Figure 4E:
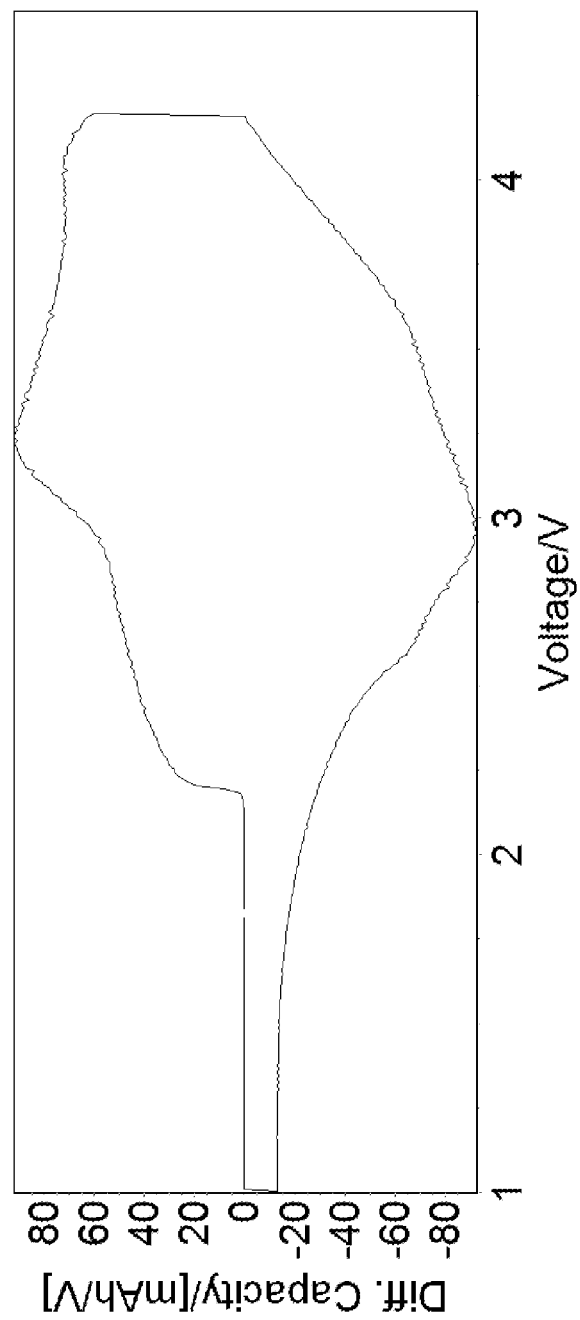
FIG. 4(E) shows the Third Cycle Differential Capacity Profiles (Differential Capacity [mAh/g/V]) versus Na-ion Cell voltage [V]) for a Hard Carbon//Na$_{0.9}$Ni$_{0.3}$Mn$_{0.3}$Mg$_{0.15}$Ti$_{0.25}$O$_2$ cell, cycled between 1.0 to 4.2V at 30° C.

FIG. 4(E) shows the third cycle differential capacity profiles (Differential Capacity [mAh/g/V] versus Na-ion Cell Voltage [V]) for the Hard Carbon//$Na_{0.9}Ni_{0.3}Mn_{0.3}Mg_{0.15}Ti_{0.25}O_2$ cell (Cell #311069). These symmetrical data demonstrate the excellent reversibility of the ion-insertion reactions in this Na-ion cell.

In conclusion, the electrochemical data obtained in Example 4 demonstrate high active material specific capacity and excellent reversibility. The data are far superior to those shown in the comparative Example 1, in which both the Ni- and Na-contents are higher.

Example 5

The Effect of Charging $Na_{0.85}Ni_{0.283}Mn_{0.283}Mg_{0.142}Ti_{0.292}O_2$ Beyond the Conventional Theoretical Capacity as Determined by the $Ni^{2+}$ to $Ni^{4+}$ Redox Couple, in Accordance with the Process of the Present Invention A Hard Carbon//$Na_{0.85}Ni_{0.0.283}Mn_{0.283}Mg_{0.142}Ti_{0.292}O_2$ cell was prepared as described below and then overcharged and held at 4.2V in accordance with the process of the present invention.

The data shown in FIGS. 5(B) to 5(E) are derived from the constant current cycling data for a $Na_{0.85}Ni_{0.283}Mn_{0.283}Mg_{0.142}Ti_{0.292}O_2$ active material in a Na-ion cell (Cell #311068) where this cathode material was coupled with a capacity balanced Hard Carbon (Carbotron P/J) anode material. The electrolyte used was a 0.5 M solution of $NaClO_4$ in propylene carbonate. The constant current data were collected at an approximate current density of 0.125 mA/cm$^2$ between voltage limits of 1.00 and 4.20 V. To fully charge the cell the Na-ion cell was potentiostatically held at 4.2 V at the end of the constant current charging process until the current dropped to less than 1% of the constant current value. The cell testing was carried out at 30° C. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 5A:
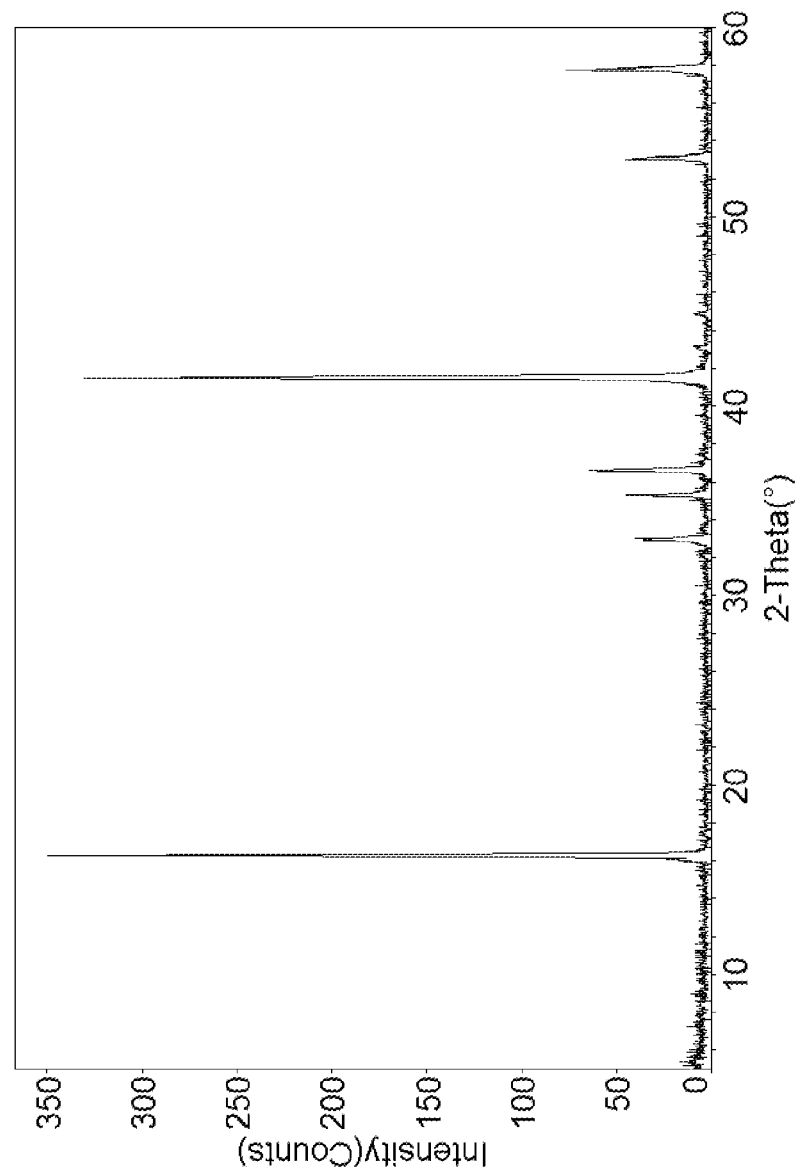
FIG. 5(A) is the XRD profile for the compound Na$_{0.85}$Ni$_{0.283}$Mn$_{0.283}$Mg$_{0.142}$Ti$_{0.292}$O$_2$ used in Example 5.
Figure 5B:
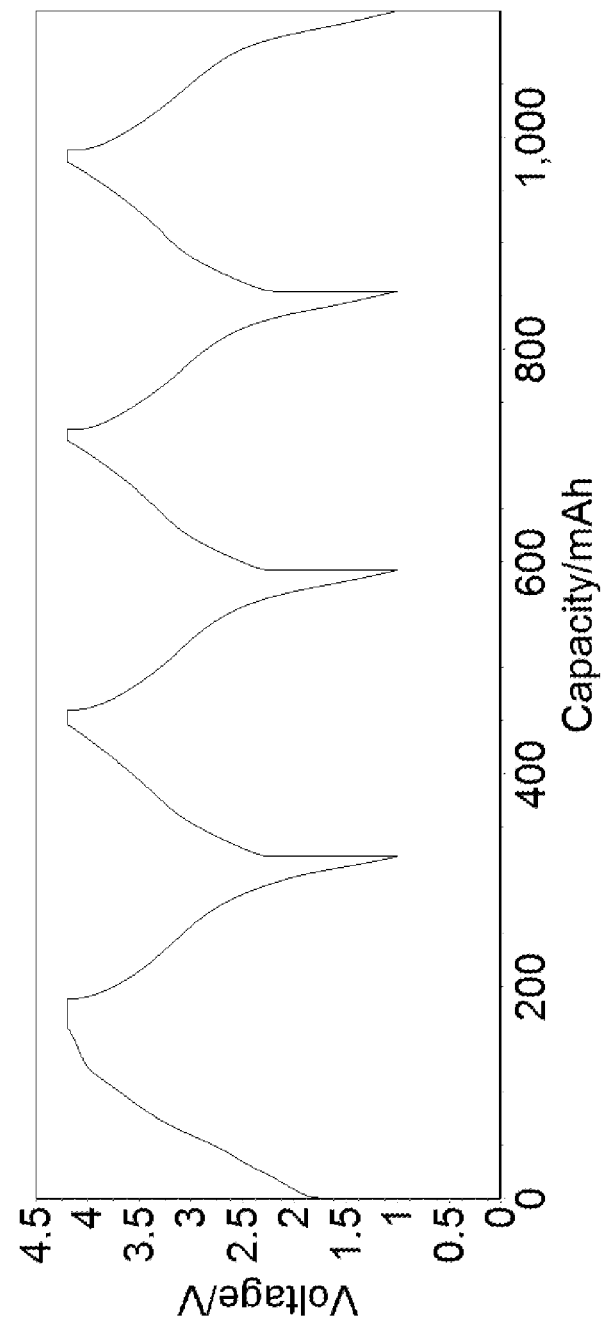
FIG. 5(B) shows the Charge-Discharge Voltage Profiles for the first 4 cycles (Na-ion cell Voltage [V] versus Cumulative Cathode Specific Capacity [mAh/g]) for a Hard Carbon//Na$_{0.85}$Ni$_{0.283}$Mn$_{0.283}$Mg$_{0.142}$Ti$_{0.292}$O$_2$ cell, cycled between 1.0 to 4.2V at 30° C.

FIG. 5(B) shows the first 4 charge-discharge cycles (Na-ion Cell Voltage [V] versus Cumulative Cathode Specific Capacity [mAh/g]) for the Hard Carbon//$Na_{0.85}Ni_{0.283}Mn_{0.283}Mg_{0.142}Ti_{0.292}O_2$ cell (Cell #311068). During the first charge process an anomalously high charge capacity is realized—a cathode specific capacity of 187 mAh/g is achieved a figure which is significantly larger than the theoretical specific capacity (based on the $Ni^{2+}$ to $Ni^{4+}$ redox couple) for the $Na_{0.85}Ni_{0.0.283}Mn_{0.283}Mg_{0.142}Ti_{0.292}O_2$ active material. In particular, a two section voltage profile is clearly evident during this initial cell charge step. At cell voltages lower than about 4.0 V a sloping profile is evident reflecting the conventional Na extraction process based on the $Ni^{2+}$ to $Ni^{4+}$ redox couple from the $Na_{0.85}Ni_{0.283}Mn_{0.283}Mg_{0.142}Ti_{0.292}O_2$ active material. At cell voltages greater than about 4.0 V, a more flat voltage region is evident which presumably reflects a new Na extraction process (i.e. not based on the $Ni^{2+}$ to $Ni^{4+}$ redox couple) occurring for the $Na_{0.85}Ni_{0.283}Mn_{0.283}Mg_{0.142}Ti_{0.292}O_2$ active material. Importantly, this two section charge behaviour is not evident on subsequent cell charge profiles. The first discharge process is equivalent to a cathode specific capacity of 134 mAh/g.

Figure 5C:
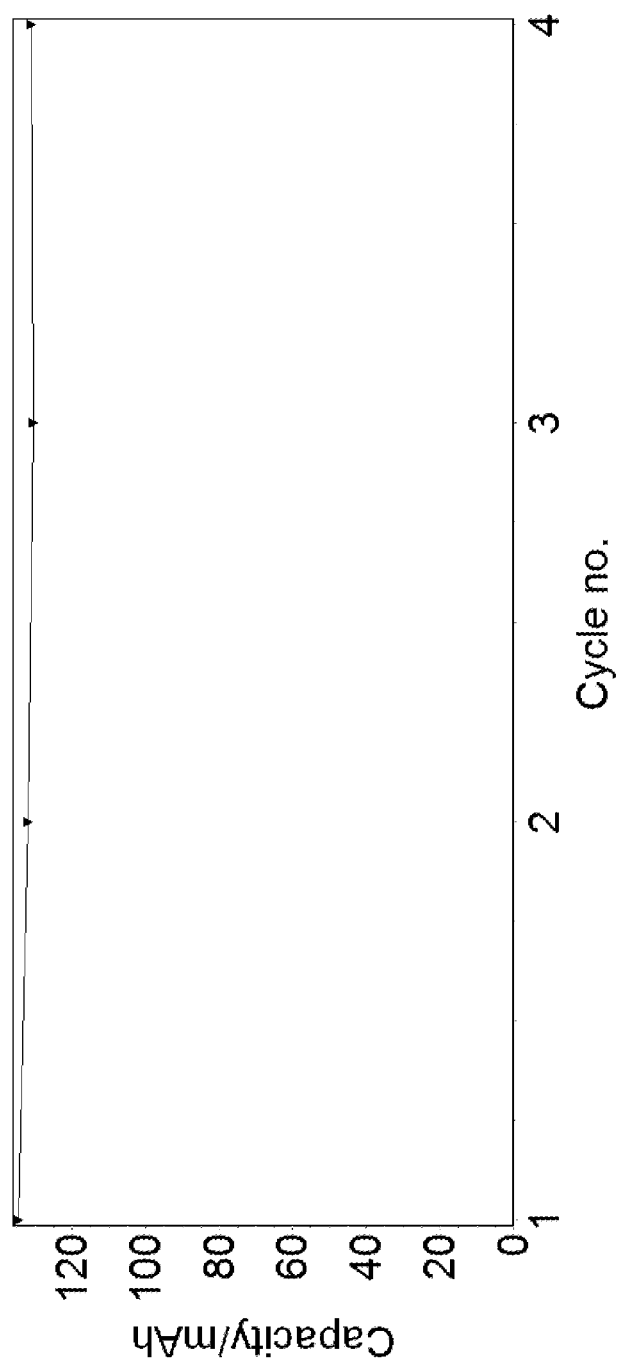
FIG. 5(C) shows the Cycle Life Performance (Cathode Specific Capacity [mAh/g] versus Cycle Number) for a Hard Carbon//Na$_{0.85}$Ni$_{0.283}$Mn$_{0.283}$Mg$_{0.142}$Ti$_{0.292}$O$_2$ cell, cycled between 1.0 to 4.2V at 30° C.

FIG. 5(C) shows the cycle life performance (Cathode Specific Capacity [mAh/g] versus Cycle Number) for the Hard Carbon//Na$_{0.85}$Ni$_{0.283}$Mn$_{0.283}$Mg$_{0.142}$Ti$_{0.292}$O$_2$ cell (Cell #311068). The cell shows good reversibility with the delivered cathode specific capacity being around 131 mAh/g after 4 cycles.

Figure 5D:
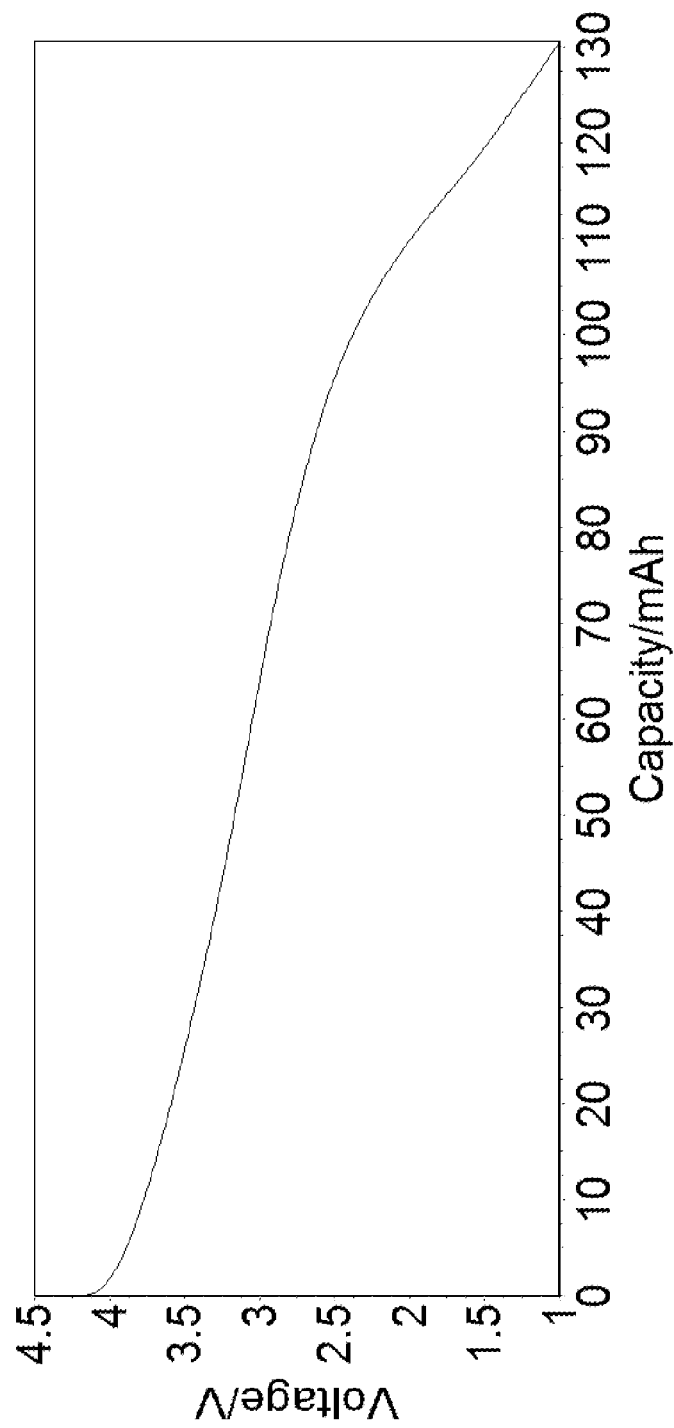
FIG. 5(D) shows the Third Cycle Discharge Voltage Profile (Na-ion Cell Voltage [V] versus Cathode Specific Capacity [mAh/g]) for a Hard Carbon//Na$_{0.85}$Ni$_{0.283}$Mn$_{0.283}$Mg$_{0.142}$Ti$_{0.292}$O$_2$ cell, cycled between 1.0 to 4.2V at 30° C.

FIG. 5D) shows the third cycle discharge voltage profile (Na-ion Cell Voltage [V] versus Cathode Specific Capacity [mAh/g]) for the Hard Carbon// Na$_{0.85}$Ni$_{0.283}$Mn$_{0.283}$Mg$_{0.142}$Ti$_{0.292}$O$_2$ cell (Cell #311068). The cathode specific capacity in this cycle corresponds to 131 mAh/g.

Figure 5E:
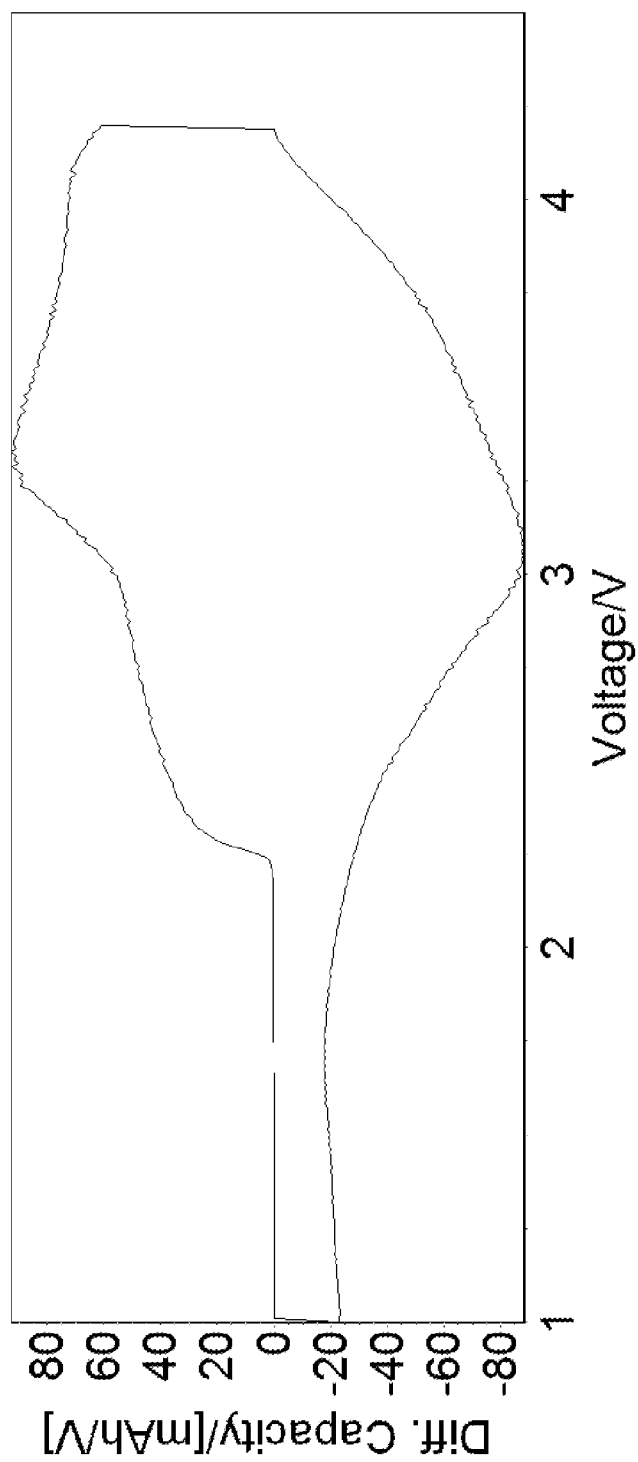
FIG. 5(E) shows the Third Cycle Differential Capacity Profiles (Differential Capacity [mAh/g/V]) versus Na-ion Cell voltage [V]) for a Hard Carbon//Na$_{0.85}$Ni$_{0.283}$Mn$_{0.283}$Mg$_{0.142}$Ti$_{0.292}$O$_2$ cell, cycled between 1.0 to 4.2V at 30° C.

FIG. 5(E) shows the third cycle differential capacity profiles (Differential Capacity [mAh/g/V] versus Na-ion Cell Voltage [V]) for the Hard Carbon// Na$_{0.85}$Ni$_{0.283}$Mn$_{0.283}$Mg$_{0.142}$Ti$_{0.292}$O$_2$ cell (Cell #311068). These symmetrical data demonstrate the excellent reversibility of the ion-insertion reactions in this Na-ion cell.

In conclusion, the electrochemical data obtained in Example 5 demonstrate high active material specific capacity and excellent reversibility. The data are far superior to those shown in the comparative Example 1, in which both the Ni- and Na-contents are higher.

Example 6

Effecting Oxygen Loss from Na$_{0.833}$Ni$_{0.317}$Mn$_{0.467}$Mg$_{0.1}$Ti$_{0.117}$O$_2$ in Accordance with the Process of the Present Invention A Hard Carbon/Na$_{0.833}$Ni$_{0.317}$Mn$_{0.467}$Mg$_{0.1}$Ti$_{0.117}$O$_2$ cell was prepared as described below and then overcharged and held at 4.2V in accordance with the process of the present invention.

The data shown in FIGS. 6(B) to 6(E) are derived from the constant current cycling data for a Na$_{0.833}$Ni$_{0.317}$Mn$_{0.467}$Mg$_{0.1}$Ti$_{0.117}$O$_2$ active material in a Na-ion cell (Cell #311063) where this cathode material was coupled with a capacity balanced Hard Carbon (Carbotron P/J) anode material. The electrolyte used was a 0.5 M solution of NaClO$_4$ in propylene carbonate. The constant current data were collected at an approximate current density of 0.125 mA/cm$^2$ between voltage limits of 1.00 and 4.20 V. To fully charge the cell the Na-ion cell was potentiostatically held at 4.2 V at the end of the constant current charging process until the current dropped to less than 1% of the constant current value. The cell testing was carried out at 30° C. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 6A:
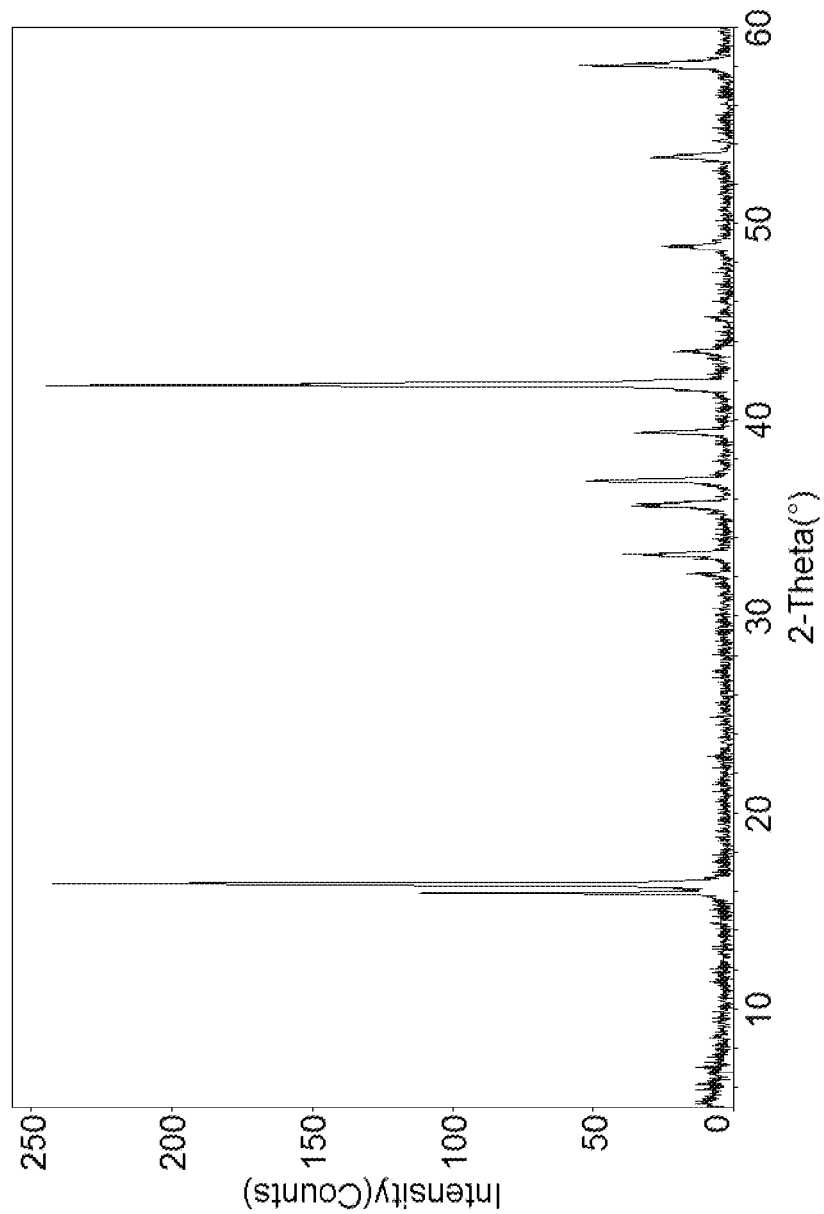
FIG. 6(A) is the XRD profile for the material Na$_{0.833}$Ni$_{0.317}$Mn$_{0.467}$Mg$_{0.1}$Ti$_{0.117}$O$_2$ used in Example 6.
Figure 6B:
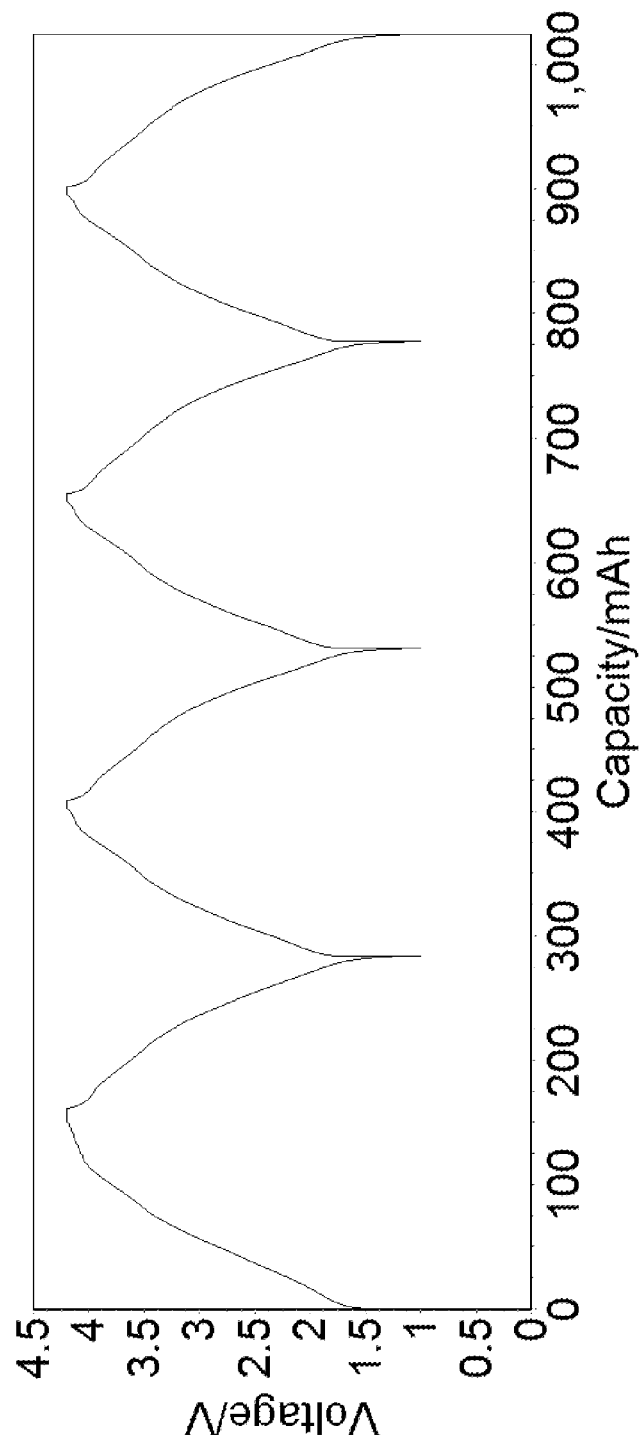
FIG. 6(B) shows the Charge-Discharge Voltage Profiles for the first 4 cycles (Na-ion cell Voltage [V] versus Cumulative Cathode Specific Capacity [mAh/g]) for a Hard Carbon//Na$_{0.833}$Ni$_{0.317}$Mn$_{0.467}$Mg$_{0.1}$Ti$_{0.117}$O$_2$ cell, cycled between 1.0 to 4.2V at 30° C.

FIG. 6(B) shows the first 4 charge-discharge cycles (Na-ion Cell Voltage [V] versus Cumulative Cathode Specific Capacity [mAh/g]) for the Hard Carbon// Na$_{0.833}$Ni$_{0.317}$Mn$_{0.467}$Mg$_{0.1}$Ti$_{0.117}$O$_2$ cell (Cell #311063). During the first charge process a cathode specific capacity of 160 mAh/g is achieved for the Na$_{0.833}$Ni$_{0.317}$Mn$_{0.467}$Mg$_{0.1}$Ti$_{0.117}$O$_2$ active material. The first discharge process is equivalent to a cathode specific capacity of 122 mAh/g.

Figure 6C:
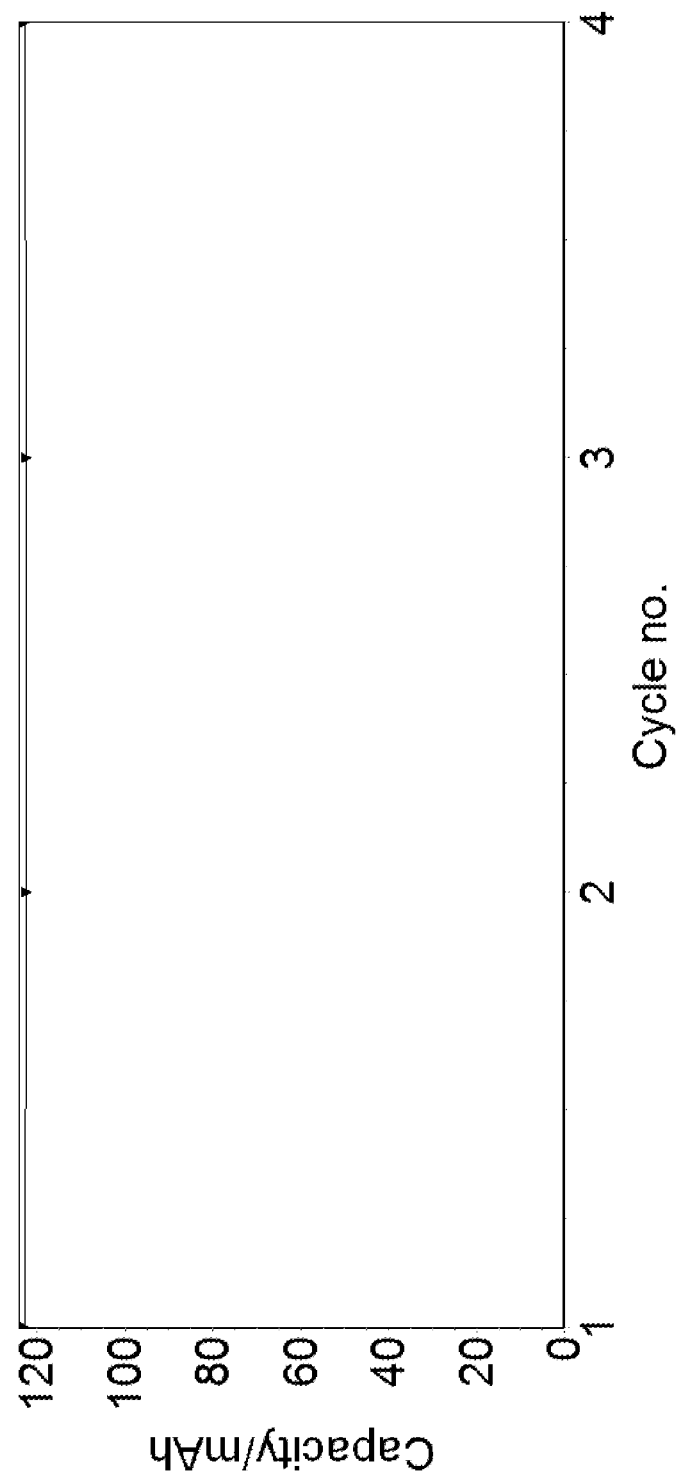
FIG. 6(C) shows the Cycle Life Performance (Cathode Specific Capacity [mAh/g] versus Cycle Number) for a Hard Carbon//Na$_{0.833}$Ni$_{0.317}$Mn$_{0.467}$Mg$_{0.1}$Ti$_{0.117}$O$_2$ cell, cycled between 1.0 to 4.2V at 30° C.

FIG. 6(C) shows the cycle life performance (Cathode Specific Capacity [mAh/g] versus Cycle Number) for the Hard Carbon//Na$_{0.833}$Ni$_{0.317}$Mn$_{0.467}$Mg$_{0.1}$Ti$_{0.117}$O$_2$ cell (Cell #311063). The cell shows good reversibility with the delivered cathode specific capacity being around 122 mAh/g after 4 cycles.

Figure 6D:
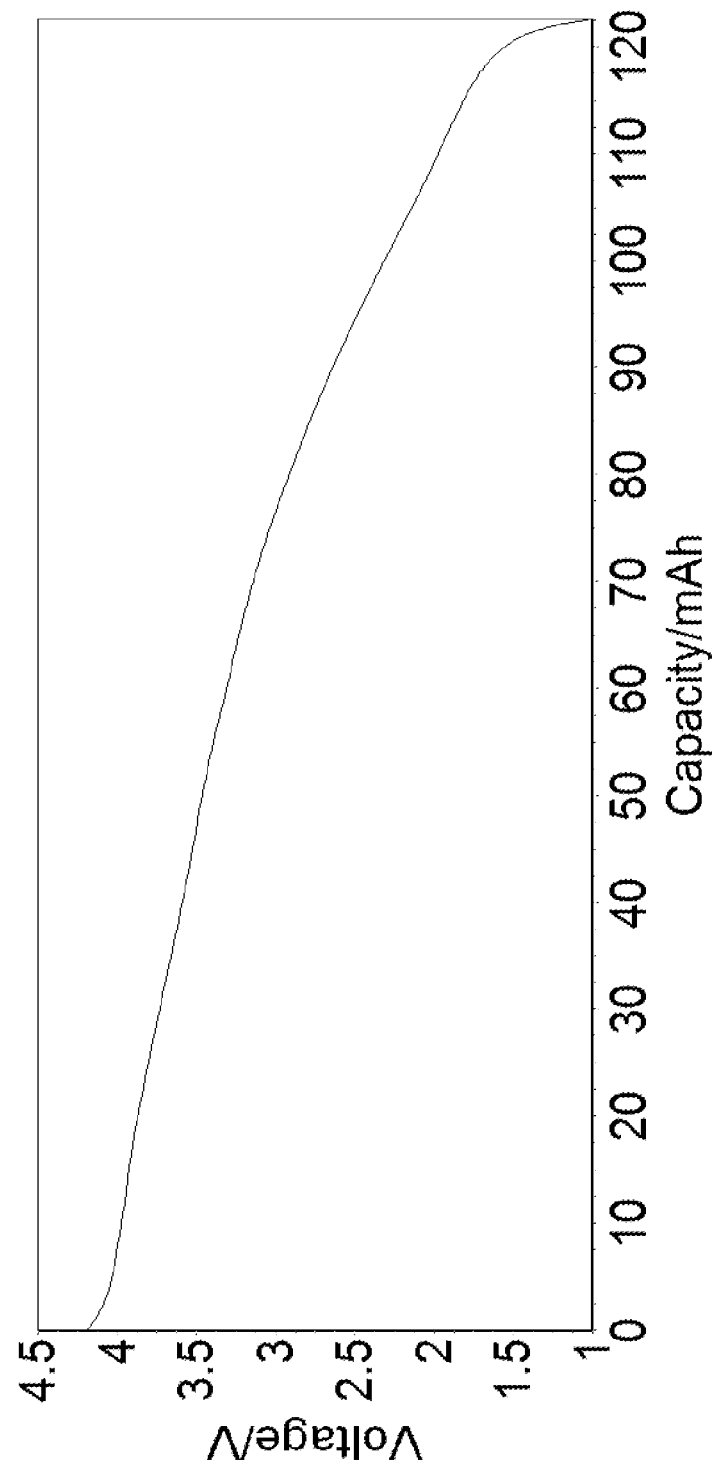
FIG. 6(D) shows the Third Cycle Discharge Voltage Profile (Na-ion Cell Voltage [V] versus Cathode Specific Capacity [mAh/g]) for a Hard Carbon//Na$_{0.833}$Ni$_{0.317}$Mn$_{0.467}$Mg$_{0.1}$Ti$_{0.117}$O$_2$ cell, cycled between 1.0 to 4.2V at 30° C.

FIG. 6D) shows the third cycle discharge voltage profile (Na-ion Cell Voltage [V] versus Cathode Specific Capacity [mAh/g]) for the Hard Carbon// Na$_{0.833}$Ni$_{0.317}$Mn$_{0.467}$Mg$_{0.1}$Ti$_{0.117}$O$_2$ cell (Cell #311063). The cathode specific capacity in this cycle corresponds to 122 mAh/g.

Figure 6E:
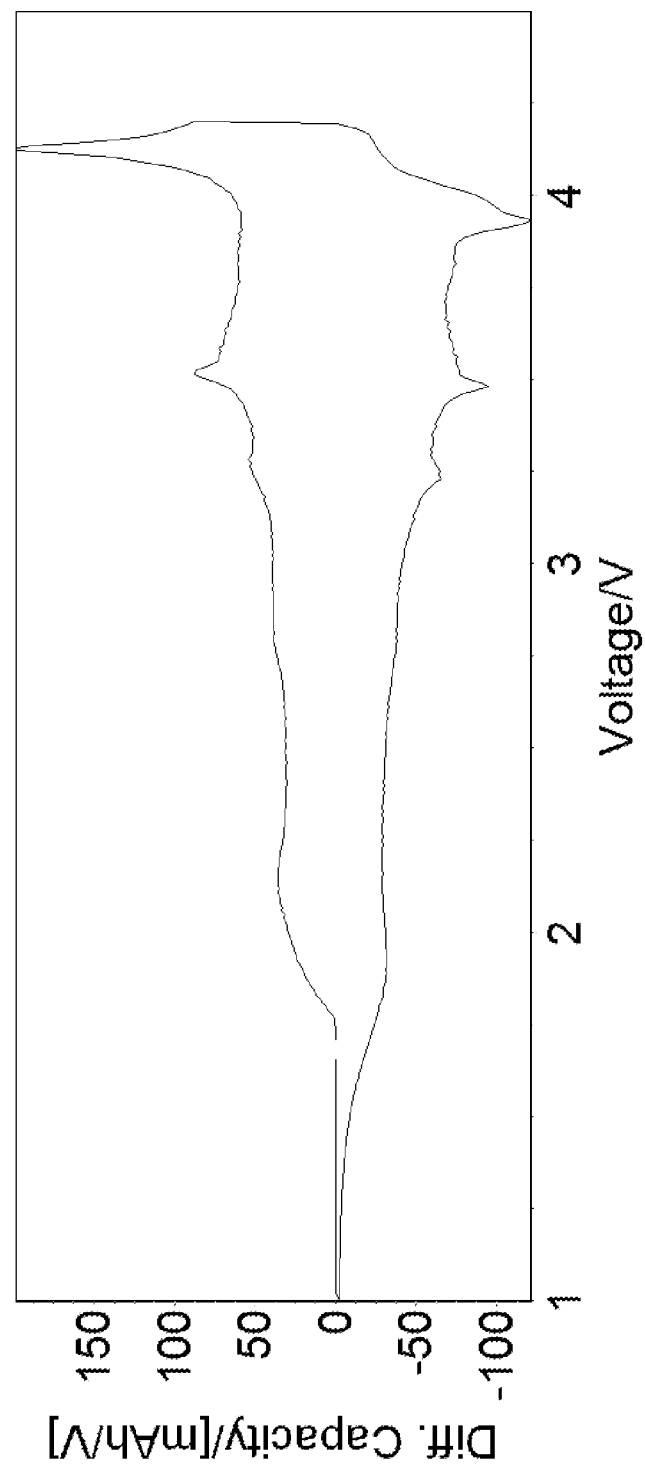
FIG. 6(E) shows the Third Cycle Differential Capacity Profiles (Differential Capacity [mAh/g/V]) versus Na-ion Cell voltage [V]) for a Hard Carbon//Na$_{0.833}$Ni$_{0.317}$Mn$_{0.467}$Mg$_{0.1}$Ti$_{0.117}$O$_2$ cell, cycled between 1.0 to 4.2V at 30° C.

FIG. 6(E) shows the third cycle differential capacity profiles (Differential Capacity [mAh/g/V] versus Na-ion Cell Voltage [V]) for the Hard Carbon// Na$_{0.833}$Ni$_{0.317}$Mn$_{0.467}$Mg$_{0.1}$Ti$_{0.117}$O$_2$ cell (Cell #311063). These symmetrical data demonstrate the excellent reversibility of the ion-insertion reactions in this Na-ion cell.

The Applicant does not wish to be rigidly bound to the following explanation but it is their current belief that the process of overcharging is capable of oxidising O$^{2-}$ in the lattice, thus releasing this from the structure as O$_2$, and this is accompanied by a removal of some of the remaining sodium-ions. The loss of both sodium and oxygen in this way appears to explain an observed reduction in both the a- and c-parameters of the unit cell, and the resulting overall reduction in unit cell volume.

Example 7

Figure 7:
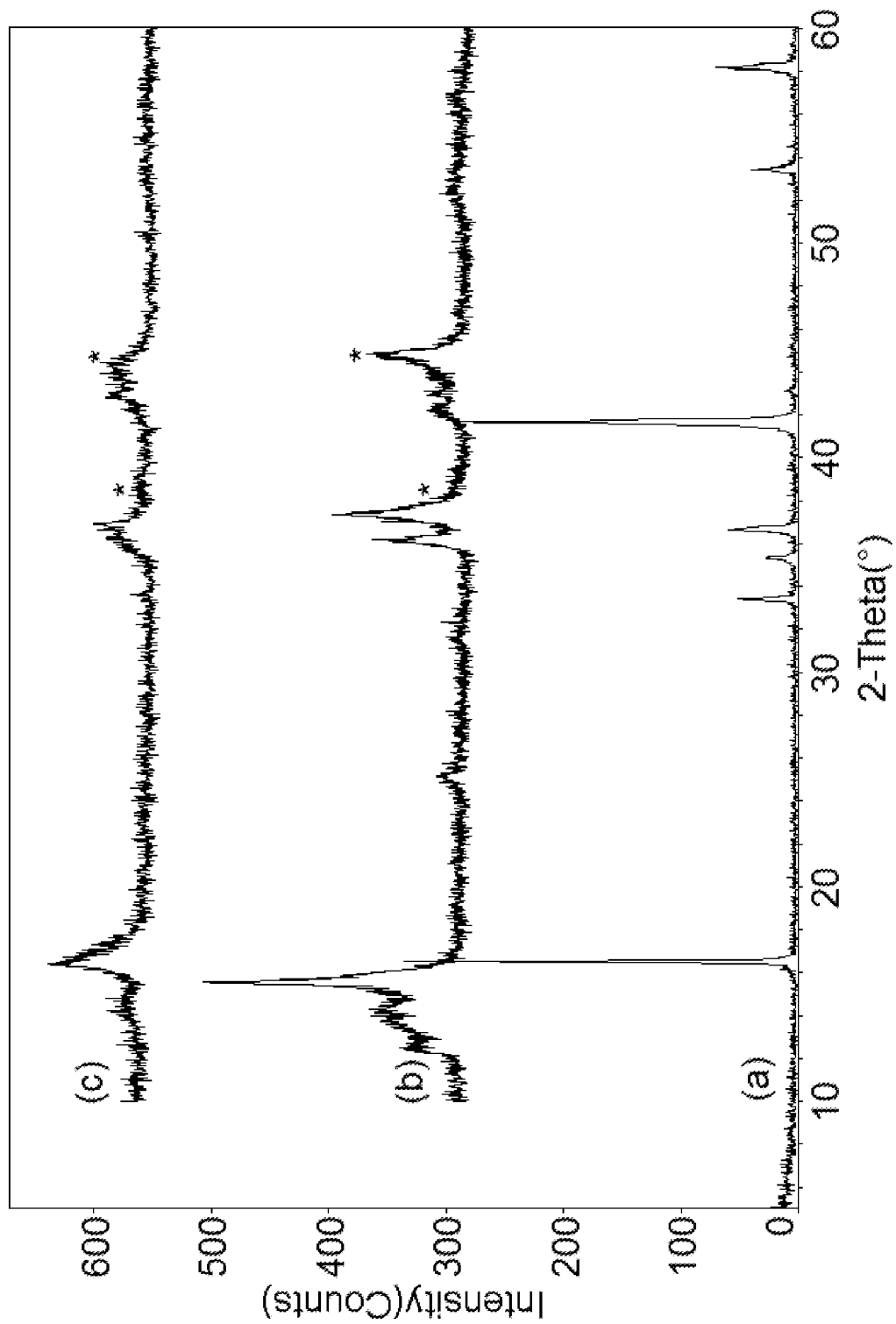
FIG. 7 is a comparison of XRD profiles for a) the precursor starting material, Na$_{0.95}$Ni$_{0.3167}$Ti$_{0.3167}$Mg$_{0.1583}$Mn$_{0.2083}$O$_2$, b) an electrode, originally containing Na$_{0.95}$Ni$_{0.3167}$Ti$_{0.3167}$Mg$_{0.1583}$Mn$_{0.2083}$O$_2$, recovered from a cell after charging to a specific capacity of 139 mAh/g and c) an electrode, originally containing Na$_{0.95}$Ni$_{0.3167}$Ti$_{0.3167}$Mg$_{0.1583}$Mn$_{0.2083}$O$_2$ recovered from a cell after charging to a specific capacity of 192 mAh/g.

The Preparation of Na$_{0.2075}$Ni$_{0.3167}$Mn$_{0.3167}$Mg$_{0.1583}$Ti$_{0.2083}$O$_{1.9454}$ Using the Process of the Present Invention i.e. from a Cell Showing Anomalous Capacity Behaviour Fully Charged Active precursor doped nickelate-containing compound Na$_{0.95}$Ni$_{0.0.3167}$Mn$_{0.3167}$Mg$_{0.1583}$Ti$_{0.2083}$O$_2$ (compound 2 in Table 1), was prepared using the conditions outlined in Table 1 and produced the XRD shown in FIG. 7. The asterisks in FIG. 7 indicate peak positions for aluminium, as the aluminium current collector may contribute some intensity to XRD patterns (b) and (c).

This compound was made into a cell (#412004) comprising hard carbon (Carbotron P(J)) anode// Na$_{0.95}$Ni$_{0.3167}$Mn$_{0.3167}$Mg$_{0.1583}$Ti$_{0.2083}$O$_2$ cathode and using an electrolyte comprising 0.5M NaPF$_6$ in EC/DEC/PC (1:1:1). The Active Mass of the cathode in the as-prepared cell=53.6 mg. Following a charge process to a specific capacity of 192 mAh/g (i.e. incorporating the anomalous capacity process of the present invention) (XRD shown in FIG. 7c) produced), the cathode electrode was removed from the cell, washed several times in clean dimethyl carbonate to remove the electrolyte and then dried at 70° C. The Active Mass of the washed cathode after this first charge process=44.2 mg.

Looking at FIG. 7c), it is clear that the material obtained following the charge process to a specific capacity of 192 mAh/g is not the same as that shown in either FIG. 7b) (charged to a specific capacity of 139 mAh/g) which does not include an anomalous capacity process, only a conventional Ni$^{2+}$ to Ni$^{4+}$ charging process, or that shown by the original active precursor doped nickelate-containing material Na$_{0.95}$Ni$_{0.3167}$Mn$_{0.3167}$Mg$_{0.1583}$Ti$_{0.2083}$O$_2$ (shown in FIG. 7a)). The proposed composition for the product obtained following the overcharge process to a specific capacity of 192 mAh/g is Na$_{0.2075}$Ni$_{0.3167}$Mn$_{0.3167}$Mg$_{0.1583}$Ti$_{0.2083}$O$_{1.9454}$, as determined by the following mass loss experiment.

Mass Loss Experiment to Evidence the Formation of Na$_{0.2075}$Ni$_{0.3167}$Mn$_{0.3167}$Mg$_{0.1583}$Ti$_{0.2083}$O$_{1.9454}$.

Using the information above, the Active Mass Loss following overcharging the above cell (#412004) containing $Na_{0.95}Ni_{0.3167}Mn_{0.3167}Mg_{0.1583}Ti_{0.2083}O_2$ cathode material=(53.6 mg 44.2 mg)=9.4 mg.

Thus, the Measured % Mass Loss=17.5%

If the charge process was just by Na-ion extraction then mass loss should be:

Starting compound $Na_{0.95}Ni_{0.3167}Mn_{0.3167}Mg_{0.1583}Ti_{0.2083}O_2=$
Molecular Weight=103.6

Based on only $Ni^{2+}$ to $Ni^{4+}$ redox process, on cell charge it is only possible to extract 0.6333Na ions per formula unit, i.e.

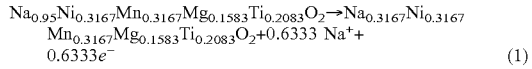

$Na_{0.95}Ni_{0.3167}Mn_{0.3167}Mg_{0.1583}Ti_{0.2083}O_2 \rightarrow Na_{0.3167}Ni_{0.3167}Mn_{0.3167}Mg_{0.1583}Ti_{0.2083}O_2 + 0.6333$ $Na^+$ + $0.6333e^-$    (1)

Therefore, the theoretical capacity based on this reaction (1) may be given by the following:
Theoretical Specific Capacity=(0.6333×96485)/(103.6×3.6) =164 mAh/g
Thus the Expected % Mass loss for reaction (1)=(14.6/ 103.6)×100=14.0%

The charge process for Cell #412004 corresponds to an actual cathode specific capacity of 192 mAh/g i.e. far in excess of the expected theoretical specific capacity of 164 mAh/g.

Thus it is proposed that the following overall charge mechanism is:

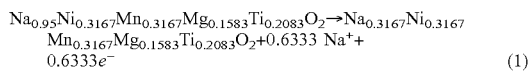

$Na_{0.95}Ni_{0.3167}Mn_{0.3167}Mg_{0.1583}Ti_{0.2083}O_2 \rightarrow Na_{0.3167}Ni_{0.3167}Mn_{0.3167}Mg_{0.1583}Ti_{0.2083}O_2 + 0.6333$ $Na^+$ + $0.6333e^-$    (1)

followed by:

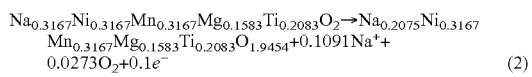

$Na_{0.3167}Ni_{0.3167}Mn_{0.3167}Mg_{0.1583}Ti_{0.2083}O_2 \rightarrow Na_{0.2075}Ni_{0.3167}Mn_{0.3167}Mg_{0.1583}Ti_{0.2083}O_{1.9454} + 0.1091Na^+ + 0.0273O_2 + 0.1e^-$    (2)

Looking at the overall process (by the Applicants mechanism) for the extraction of Na:

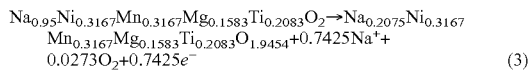

$Na_{0.95}Ni_{0.3167}Mn_{0.3167}Mg_{0.1583}Ti_{0.2083}O_2 \rightarrow Na_{0.2075}Ni_{0.3167}Mn_{0.3167}Mg_{0.1583}Ti_{0.2083}O_{1.9454} + 0.7425Na^+ + 0.0273O_2 + 0.7425e^-$    (3)

Therefore, the theoretical capacity based on this reaction (3) may be given by:
Theoretical Specific Capacity=(0.7425×96485)/ (103.6×3.6)=192 mAh/g Also, the Expected mass loss for reaction (3)=((103.6− 85.7)/103.6)×100%=17.3%. This percentage mass loss is extremely close to the 17.5% (as detailed above) which is observed.

In conclusion, on the basis that there is very close correspondence between theoretical and actual results for both Specific Capacity and Expected Mass Loss, the Applicant has been able to determine with a high degree of certainty that $Na_{0.2075}Ni_{0.3167}Mn_{0.3167}Mg_{0.1583}Ti_{0.2083}O_{1.9454}$ is obtained when $Na_{0.95}Ni_{0.3167}Mn_{0.3167}Mg_{0.1583}Ti_{0.2083}O_2$ is charged to the end of the second unconventional voltage plateau.

From reaction (3) above, it is proposed that the anomalous capacity arises as a result of the net loss of $Na_2O$, i.e. the production of active Nations plus the liberation of $O_2$, and this produces a new layered oxide active material $Na_{0.2075}Ni_{0.3167}Mn_{0.3167}Mg_{0.1583}Ti_{0.2083}O_{1.9454}$. This is surprising because it is not a usual charging mechanism i.e. a simple $Na^+$ extraction from the cathode, but is a structural change that releases $Na^+$ and oxygen from the material to produce a new compound.

Example 8

Charging $Na_{0.95}Ni_{0.3167}Mn_{0.3167}Mg_{0.1583}Ti_{0.2083}O_2$ Up to the Conventional Theoretical Maximum for the $Ni^{2+}$ to $Ni^{4+}$ Redox Process, ie. From a Cell Showing No Anomalous Capacity Behaviour Partially Charged Active precursor doped nickelate-containing compound $Na_{0.96}Ni_{0.3167}Mn_{0.3167}Mg_{0.1583}Ti_{0.2083}O_2$ (compound 2 in Table 1), was prepared using the conditions outlined in Table 1 and produced the XRD shown in FIG. 7a)). This compound was made into a cell (#412003) comprising hard carbon (Carbotron P(J)) anode// $Na_{0.96}Ni_{0.3167}Mn_{0.3167}Mg_{0.1583}Ti_{0.2083}O_2$ cathode and using an electrolyte comprising 0.5M $NaPF_6$ in EC/DEC/PC (1:1:1). The Active Mass of the cathode in the as-prepared cell=51.0 mg.

Following a charge process to a specific capacity of 139 mAh/g (i.e. not incorporating the anomalous capacity process of the present invention) instead just using a conventional $Ni^{2+}$ to $Ni^{4+}$ charging process (XRD shown in FIG. 7b) produced), the cathode electrode was removed from the cell, washed several times in clean dimethyl carbonate to remove the electrolyte and then dried at 70° C. The Active Mass of the washed cathode after this first charge process=45.0 mg.

Looking at FIG. 7b), it is clear that the material obtained following the charge process to a specific capacity of 139 mAh/g is not the same as that shown in either FIG. 7c) (charged to a specific capacity of 192 mAh/g) which includes an anomalous capacity process, or that shown by the original active precursor doped nickelate-containing material $Na_{0.96}Ni_{0.3167}Mn_{0.3167}Mg_{0.1583}Ti_{0.2083}O_2$ (shown in FIG. 7a)). The proposed composition for the product obtained following the overcharge process to a specific capacity of 139 mAh/g is $Na_{0.4125}Ni_{0.3167}Mn_{0.3167}Mg_{0.1583}Ti_{0.2083}O_2$, as determined by the following mass loss experiment.

Mass Loss Experiment to Evidence the Formation of $Na_{0.4125}Ni_{0.3167}Mn_{0.3167}Mg_{0.1583}Ti_{0.2083}O_2$.

Using the information above, the Active Mass Loss following overcharging the above cell (#412003) containing $Na_{0.96}Ni_{0.3167}Mn_{0.3167}Mg_{0.1583}Ti_{0.2083}O_2$ cathode material=(51.0 mg 45.0 mg)=6 mg.
Mesaured % Mass Loss=11.8%

If charge process was just by Na ion extraction then mass loss should be:
Starting compound=$Na_{0.95}Ni_{0.3167}Mn_{0.3167}Mg_{0.1583}Ti_{0.2083}O_2$
Molecular weight=103.6

Based on only the $Ni^{2+}$ to $Ni^{4+}$ redox process, the charge process may be given as:

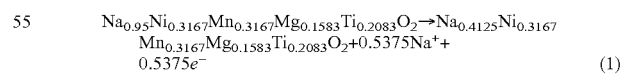

$Na_{0.95}Ni_{0.3167}Mn_{0.3167}Mg_{0.1583}Ti_{0.2083}O_2 \rightarrow Na_{0.4125}Ni_{0.3167}Mn_{0.3167}Mg_{0.1583}Ti_{0.2083}O_2 + 0.5375Na^+ + 0.5375e^-$    (1)

Expected % Mass Loss for Reaction (1)=(103.6−91.3)/ 103.6×100=11.9%

In conclusion, on the basis that there is very close correspondence between theoretical and actual results for the Expected % Mass Loss 11.8% v 11.9%, the Applicant has been able to determine with a high degree of certainty that $Na_{0.4125}Ni_{0.3167}Mn_{0.3167}Mg_{0.1583}Ti_{0.2083}O_2$ is obtained when $Na_{0.95}Ni_{0.3167}Mn_{0.3167}Mg_{0.1583}Ti_{0.2083}O_2$ is charged to the convention theoretical charge process i.e. the $Ni^{2+}$ to $Ni^{4+}$ redox reaction takes place under these conditions.

The invention claimed is:

1. A doped nickelate-containing compound comprising:
$A_a M^1_v M^2_w M^3_x M^4_y M^5_z O_{2-c}$
wherein
A is either sodium or a mixed alkali metal in which sodium is the major constituent;
$M^1$ is nickel in oxidation state from 2+ to less than or equal to 4+;
$M^2$ comprises a metal in oxidation state greater than 0 to less than or equal to 4+, selected from one or more of tin, manganese, titanium, and zirconium;
$M^3$ comprises a metal in oxidation state 2+, selected from one or more of magnesium, calcium, copper, zinc, and cobalt;
$M^4$ comprises a metal in oxidation state greater than 0 to less than or equal to 4+, selected from one or more of tin, manganese, titanium, and zirconium;
$M^5$ comprises a metal in oxidation state 3+, selected from one or more of aluminum, iron, cobalt, molybdenum, chromium, vanadium, scandium, and yttrium;
$0 \leq a < 1$;
$v > 0$;
at least one of w and y is $>0$;
$x > 0$;
$z \geq 0$;
$0 < c \leq 0.1$;
wherein $v+w+x+y+z=1$;
and wherein a, v, w, x, y, z and c are chosen to maintain electroneutrality.

2. The doped nickelate-containing compound according to claim 1 selected from:
$Ni_{0.308}Mn_{0.308}Mg_{0.154}Ti_{0.229}O_{2-c}$;
$Ni_{0.3}Mn_{0.3}Mg_{0.15}Ti_{0.25}O_{2-c}$;
$Ni_{0.283}Mn_{0.283}Mg_{0.142}Ti_{0.292}O_{2-c}$;
$Ni_{0.317}Mn_{0.467}Mg_{0.1}Ti_{0.117}O_{2-c}$;
$Na_{0.2}Ni_{0.308}Mn_{0.308}Mg_{0.154}Ti_{0.229}O_{2-c}$;
$Na_{0.2}Ni_{0.3}Mn_{0.3}Mg_{0.15}Ti_{0.25}O_{2-c}$;
$Na_{0.2}Ni_{0.283}Mn_{0.283}Mg_{0.142}Ti_{0.292}O_{2-c}$;
$Ni_{0.325}Mn_{0.325}Mg_{0.1625}Ti_{0.1875}O_{2-c}$;
$Na_{0.2}Ni_{0.325}Mn_{0.325}Mg_{0.1625}Ti_{0.1875}O_{2-c}$;
$Na_{0.2}Ni_{0.317}Mn_{0.467}Mg_{0.1}Ti_{0.117}O_{2-c}$;
$Ni_{0.3167}Mn_{0.3167}Mg_{0.1583}Ti_{0.2083}O_{2-c}$; and
$Na_{0.2}Ni_{0.3167}Mn_{0.3167}Mg_{0.1583}Ti_{0.2083}O_{2-c}$.

3. An application device selected from an energy storage device, a battery, a rechargeable battery, an electrochemical device, and an electrochromic device, comprising the doped nickelate-containing compound of claim 1.

4. A process for making the doped nickelate-containing compound of claim 1, comprising the step of heating a reaction mixture comprising suitable starting materials that are present in the correct stoichiometric amounts so as to be substantially fully consumed during the process, and so as to produce the doped nickelate-containing compound substantially in the absence of side-reaction products and/or unreacted starting materials.

5. An application device selected from an energy storage device, a battery, a rechargeable battery, an electrochemical device, and an electrochromic device comprising one or more doped nickelate-containing compounds made by the process of claim 4.

6. An electrochemical cell comprising one or more doped nickelate-containing compounds made by the process of claim 4.

7. An electrochemical cell comprising one or more doped nickelate-containing compounds according to claim 1.

8. A method of using the electrochemical cell of claim 7 comprising cycling the electrochemical cell at a voltage within the normal voltage limits based on the $Ni^{2+}$ to $Ni^{4+}$ redox couple.

* * * * *